(12) United States Patent
Zhang et al.

(10) Patent No.: US 10,038,488 B2
(45) Date of Patent: Jul. 31, 2018

(54) PUCCH TRANSMIT DIVERSITY WITH ONE-SYMBOL STBC

(71) Applicant: QUALCOMM Incorporated, San Diego, CA (US)

(72) Inventors: Xiaoxia Zhang, San Diego, CA (US); Tao Luo, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/849,585

(22) Filed: Dec. 20, 2017

(65) Prior Publication Data

US 2018/0183508 A1 Jun. 28, 2018

Related U.S. Application Data

(60) Provisional application No. 62/438,364, filed on Dec. 22, 2016.

(51) Int. Cl.
| | | |
|---|---|---|
| H04B 7/02 | (2018.01) | |
| H04B 7/06 | (2006.01) | |
| H04W 72/04 | (2009.01) | |
| H04L 27/34 | (2006.01) | |
| H04L 1/06 | (2006.01) | |

(52) U.S. Cl.
CPC .......... *H04B 7/0669* (2013.01); *H04L 1/0643* (2013.01); *H04L 27/34* (2013.01); *H04W 72/0413* (2013.01)

(58) Field of Classification Search
CPC . H04L 5/0007; H04L 1/0625; H04L 27/2636; H04L 5/0023; H04L 27/2626; H04L 27/2602; H04B 7/0671; H04B 7/2621

USPC ......... 375/267, 295, 299; 370/344, 208, 319
See application file for complete search history.

(56) References Cited

U.S. PATENT DOCUMENTS

| | | | |
|---|---|---|---|
| 8,259,776 | B2 | 9/2012 | Lee et al. |
| 8,891,496 | B2 * | 11/2014 | Ebrahimi Tazeh Mahalleh ........ H04L 5/001 370/329 |
| 8,982,997 | B2 | 3/2015 | Jia et al. |
| 9,036,663 | B2 | 5/2015 | Baligh et al. |
| 2011/0081875 | A1 * | 4/2011 | Imamura .................. H04B 1/04 455/101 |
| 2011/0134747 | A1 | 6/2011 | Kwon et al. |
| 2012/0093139 | A1 | 4/2012 | Hooli et al. |

(Continued)

OTHER PUBLICATIONS

Luo, Xiliang, et al.; Transmit Diversity Scheme over Single SC-FDM Symbol for LTE-Advanced; IEEE GLOBECOM 2009.

(Continued)

*Primary Examiner* — Leila Malek
(74) *Attorney, Agent, or Firm* — Loza & Loza, LLP

(57) ABSTRACT

Aspects of the disclosure relate to wireless communication systems configured to provide techniques for utilizing a one-symbol space-time block code (STBC) process to encode control information for transmission on an uplink control channel. The one-symbol STBC process produces two code blocks, each for transmission on a different antenna. Each code block may be time domain spread across multiple single-carrier frequency division multiple access (SC-FDMA) uplink control channel symbols using the same spreading code to enable recovery of the code blocks at the receiver.

30 Claims, 13 Drawing Sheets

(56) References Cited

U.S. PATENT DOCUMENTS

| | | |
|---|---|---|
| 2012/0113831 A1 | 5/2012 | Pelletier et al. |
| 2013/0094463 A1* | 4/2013 | Ebrahimi Tazeh Mahalleh ........ H04L 5/001 370/329 |
| 2014/0204842 A1 | 7/2014 | Kim et al. |
| 2014/0226608 A1* | 8/2014 | Seo ...................... H04L 1/0041 370/329 |

OTHER PUBLICATIONS

International Search Report and Written Opinion—PCT/US2017/067993—ISA/EPO—dated Mar. 14, 2018.

\* cited by examiner ued entity includes a processor, a memory communicatively
PUCCH TRANSMIT DIVERSITY WITH ONE-SYMBOL STBC

PRIORITY CLAIM

This application claims priority to and the benefit of Provisional Patent Application No. 62/438,364 filed in the U.S. Patent and Trademark Office on Dec. 22, 2016, the entire content of which is incorporated herein by reference as if fully set forth below in its entirety and for all applicable purposes.

TECHNICAL FIELD

The technology discussed below relates generally to wireless communication systems, and more particularly, to transmit diversity of a physical uplink control channel.

INTRODUCTION

In a fourth-generation (4G) wireless communication network that follows standards for an evolved UMTS Terrestrial Radio Access Network (eUTRAN, also commonly known as LTE), over-the-air transmissions of information are assigned to various physical channels or signals. Very generally, these physical channels or signals carry user data traffic and control information. For example, a Physical Downlink Shared Channel (PDSCH) is the main user data traffic-bearing downlink channel, while the Physical Uplink Shared Channel (PUSCH) is the main user data traffic-bearing uplink channel. A Physical Downlink Control Channel (PDCCH) carries downlink control information (DCI) providing downlink assignments and/or uplink grants of time-frequency resources to a user equipment (UE) or a group of UEs. A Physical Uplink Control Channel (PUCCH) carries uplink control information including acknowledgement information, channel quality information, scheduling requests, and multiple-input-multiple-output (MIMO) feedback information.

Downlink and/or uplink communications between the base station and multiple UEs may further be multiplexed in time and/or frequency utilizing various multiplexing and multiple access schemes. Examples of multiple access schemes include, but are not limited to, time division multiple access (TDMA), code division multiple access (CDMA), frequency division multiple access (FDMA), orthogonal frequency division multiple access (OFDMA), sparse code multiple access (SCMA), resource spread multiple access (RSMA), single-carrier frequency division multiple access (SC-FDMA), which may be equivalent to discrete Fourier transform spread orthogonal frequency division multiple access (DFT-s-OFDMA), or other suitable multiple access schemes.

In fifth generation (5G) wireless communication networks, such as the New Radio (NR) wireless communication network, SC-FDMA (which may be equivalent to DFT-s-OFDMA) may be utilized for uplink communications on the PUCCH. Efficient techniques for achieving transmit diversity may improve channel conditions when employing the use of a single carrier waveform for the PUCCH on the uplink.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure provide techniques for utilizing a one-symbol space-time block code (STBC) process to encode control information for transmission on an uplink control channel. The one-symbol STBC process produces two code blocks, each for transmission on a different antenna. Each code block may be time domain spread across multiple single-carrier frequency division multiple access (SC-FDMA) uplink control channel symbols using the same spreading code to enable recovery of the code blocks at the receiver.

In one aspect of the disclosure, a method of wireless communication is provided. The method includes generating uplink control information including a plurality of modulated control symbols for transmission on an uplink control channel, dividing the plurality of modulated control symbols into at least a first set of modulated control symbols and a second set of modulated control symbols, and appending a first cyclic affix to the first set of modulated control symbols to produce a first information block and a second cyclic affix to the second set of modulated control symbols to produce a second information block. The method further includes encoding the first information block and the second information block utilizing space-time block coding to produce a first code block for transmission via a first antenna and a second code block for transmission via a second antenna, time domain spreading the first code block over a plurality of first SC-FDMA symbols transmitted via the first antenna utilizing a first spreading code, and time domain spreading the second code block over a plurality of second SC-FDMA symbols transmitted via the second antenna utilizing a second spreading code, where the first spreading code is the same as the second spreading code.

Another aspect of the disclosure provides a scheduled entity within a wireless communication network. The scheduled entity includes a processor, a memory communicatively coupled to the processor, and a transceiver communicatively coupled to the processor. The processor is configured to generate uplink control information including a plurality of modulated control symbols for transmission on an uplink control channel, divide the plurality of modulated control symbols into at least a first set of modulated control symbols and a second set of modulated control symbols, and append a first cyclic affix to the first set of modulated control symbols to produce a first information block and a second cyclic affix to the second set of modulated control symbols to produce a second information block. The processor is further configured to encode the first information block and the second information block utilizing space-time block coding to produce a first code block for transmission via a first antenna and a second code block for transmission via a second antenna, time domain spread the first code block over a plurality of first SC-FDMA symbols transmitted via the first antenna utilizing a first spreading code, and time domain spread the second code block over a plurality of second SC-FDMA symbols transmitted via the second antenna utilizing a second spreading code, where the first spreading code is the same as the second spreading code.

Another aspect of the disclosure provides a scheduled entity within a wireless communication network. The scheduled entity includes means for generating uplink control information including a plurality of modulated control symbols for transmission on an uplink control channel, means for dividing the plurality of modulated control symbols into at least a first set of modulated control symbols and a second set of modulated control symbols, and means for appending a first cyclic affix to the first set of modulated control symbols to produce a first information block and a second cyclic affix to the second set of modulated control symbols to produce a second information block. The scheduled entity further includes means for encoding the first information block and the second information block utilizing space-time block coding to produce a first code block for transmission via a first antenna and a second code block for transmission via a second antenna, means for time domain spreading the first code block over a plurality of first SC-FDMA symbols transmitted via the first antenna utilizing a first spreading code, and means for time domain spreading the second code block over a plurality of second SC-FDMA symbols transmitted via the second antenna utilizing a second spreading code, where the first spreading code is the same as the second spreading code.

Another aspect of the disclosure provides a method of wireless communication. The method includes receiving an uplink signal including an uplink control channel at a scheduling entity, where the uplink control channel includes a plurality of uplink control information, each transmitted by one of a set of scheduled entities, and each of the uplink control information includes a plurality of single-carrier frequency division multiple access (SC-FDMA) symbols. The method further includes time domain de-spreading the plurality of SC-FDMA symbols to produce a plurality of code blocks, and identifying, from the plurality of code blocks, a first code block and a second code block that each include a same spreading code. The method further includes applying space-time block decoding over the first code block and the second code block to produce a first information block including a first set of modulated control symbols and a first cyclic affix appended to the first set of modulated control symbols and a second information block including a second set modulated control symbols and a second cyclic affix appended to the second set of modulated control symbols. The method further includes demodulating the first set of modulated control symbols and the second set of modulated control symbols to produce a plurality of control data.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
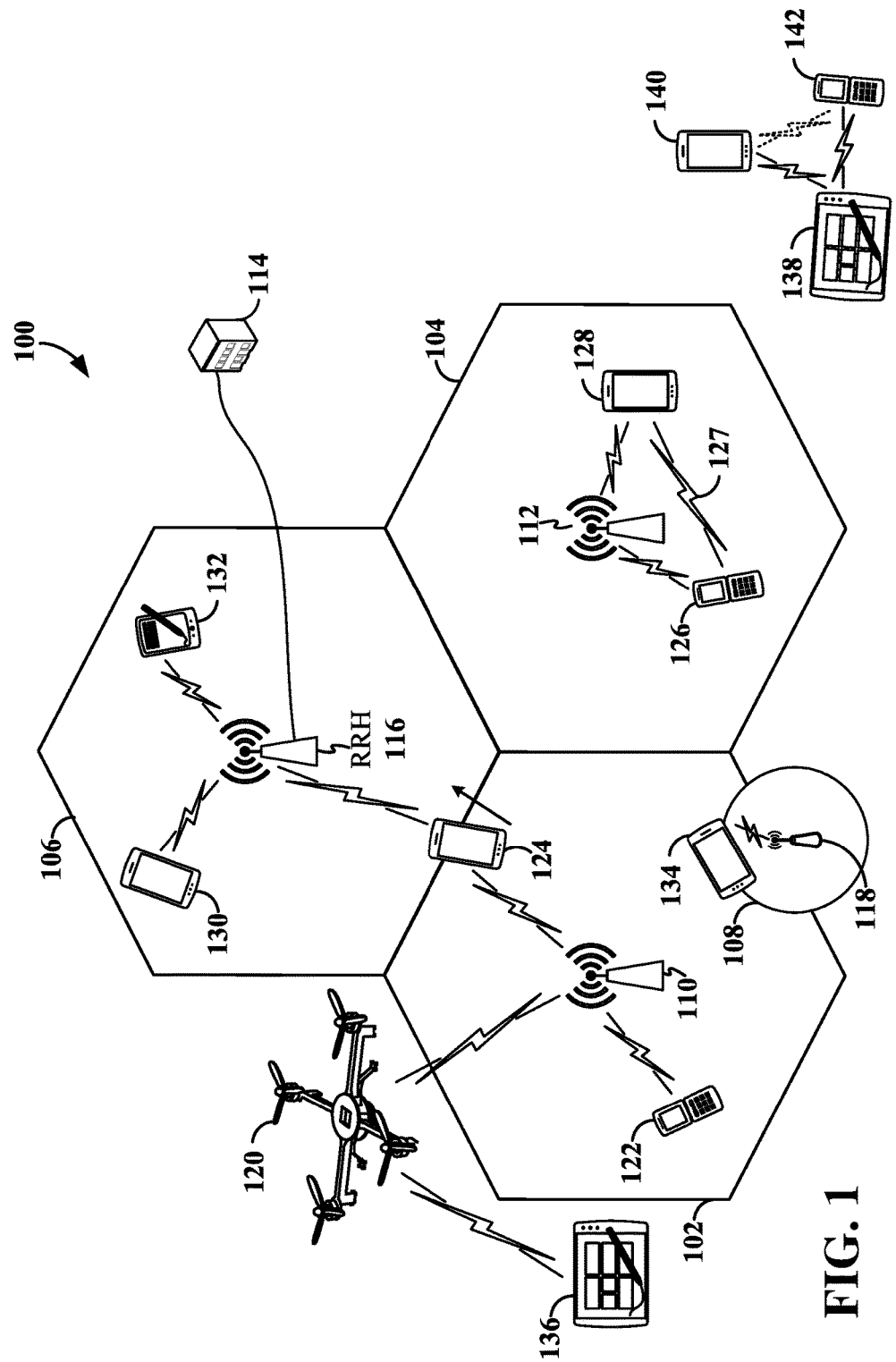
FIG. 1 is a conceptual diagram illustrating an example of a radio access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. In some examples, the radio access network 100 may be a network employing continued evolved wireless communication technologies. This may include, for example, a fifth generation (5G) or New Radio (NR) wireless communication technology based on a set of standards (e.g., issued by 3GPP, www.3gpp.org). For example, standards defined by the 3GPP following LTE-Advanced or by the 3GPP2 following CDMA2000 may be considered 5G. Standards may also include pre-3GPP efforts specified by Verizon Technical Forum and Korea Telecom SIG.

In other examples, the radio access network 100 may be a network employing a third generation (3G) wireless communication technology or a fourth generation (4G) wireless communication technology. For example, standards promulgated by the 3rd Generation Partnership Project (3GPP) and the 3rd Generation Partnership Project 2 (3GPP2) may be considered 3G or 4G, including, but not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, a medical device, implantable devices, industrial equipment, and many other devices sized, shaped, and configured for use by users.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. UEs may comprise a number of hardware structural components sized, shaped, and arranged to help in communication; such components can include antennas, antenna arrays, RF chains, amplifiers, one or more processors, etc. electrically coupled to each other.

In another example, a mobile network node (e.g., quad-copter 120) may be configured to function as a UE. For example, the quadcopter 120 may operate within cell 102 by communicating with base station 110. In some aspects of the present disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information (e.g., user data traffic) from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), single-carrier frequency division multiple access (SC-FDMA), which may be equivalent to discrete Fourier transform spread orthogonal frequency division multiple access (DFT-s-OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), single-carrier frequency division multiplexing, which may be equivalent to discrete Fourier transform spread orthogonal frequency division multiplexing (DFT-s-OFDM), or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe/slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the radio access network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity.

That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
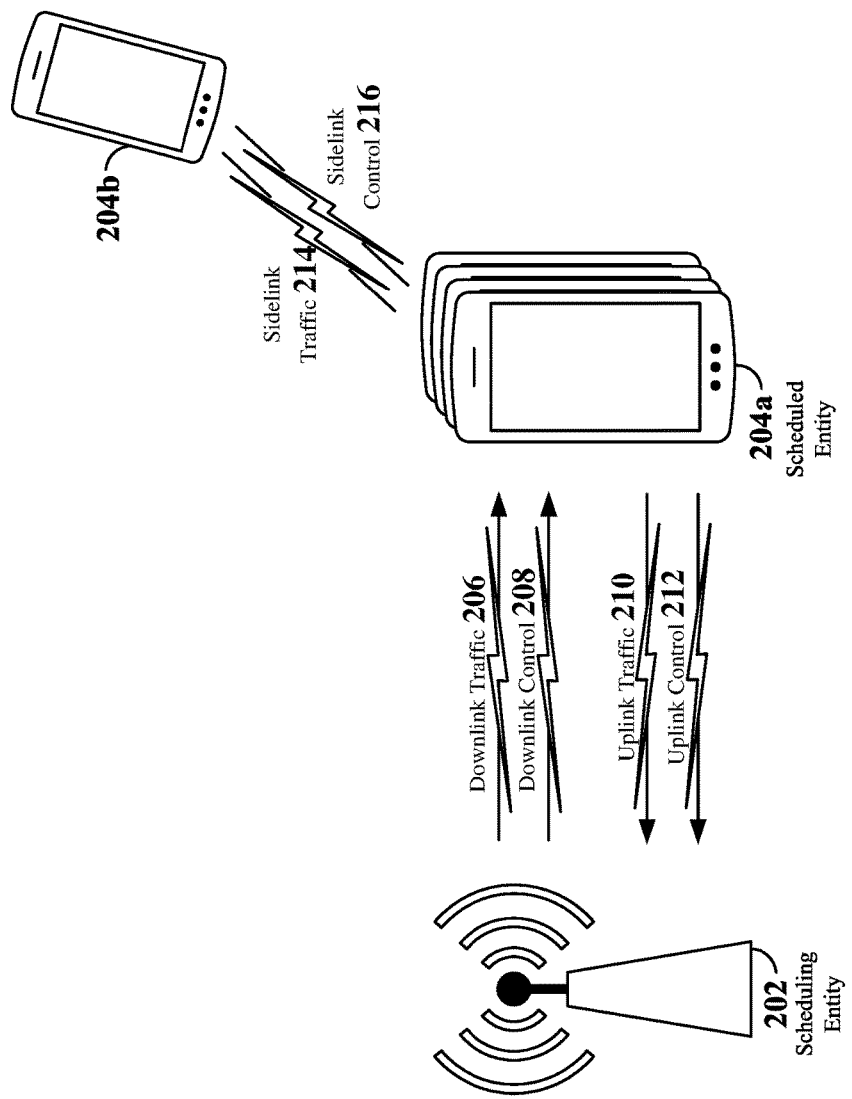
FIG. 2 is a block diagram conceptually illustrating an example of a scheduling entity communicating with one or more scheduled entities.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may transmit downlink user data traffic 206 including one or more traffic channels, such as the physical downlink shared channel (PDSCH), to one or more scheduled entities 204. The scheduling entity 202 may further broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The scheduled entities 204 may transmit uplink user data traffic 210 including one or more traffic channels, such as the physical uplink shared channel (PUSCH) to the scheduled entity 204. Furthermore, the scheduled entities 204 may transmit uplink control information 212 including one or more uplink control channels (e.g., the physical uplink control channel (PUCCH)) to the scheduling entity 202. Uplink control information (UCI) transmitted within the PUCCH may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the slot for uplink packet transmissions.

Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives control information, including but not limited to scheduling information (e.g., a grant), synchronization or timing information, or other control information from another entity in the wireless communication network such as the scheduling entity 202.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
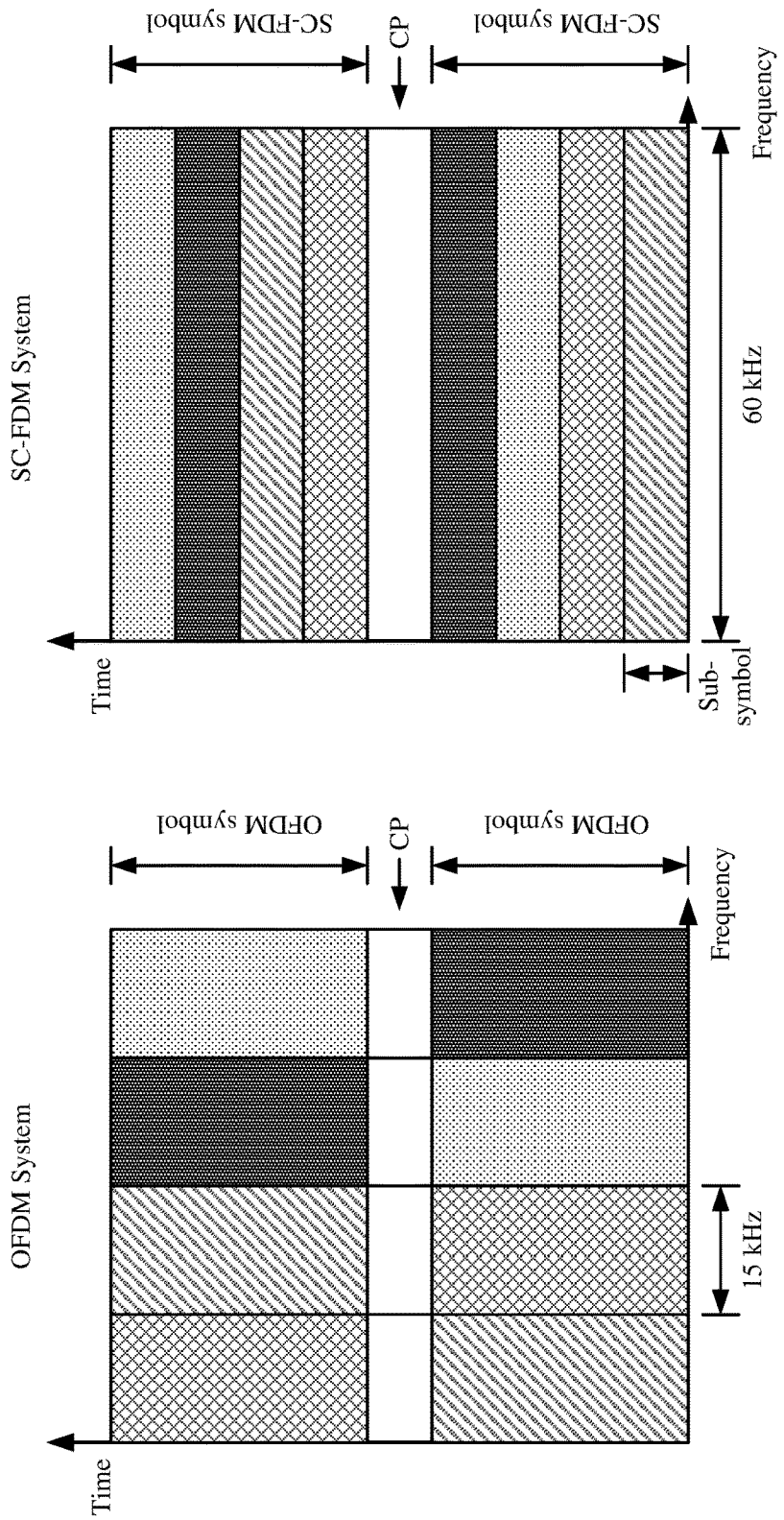
FIG. 3 is a schematic illustration of a comparison of orthogonal frequency division multiplexing (OFDM) and single-carrier frequency division multiplexing (SC-FDM) as may be implemented within a radio access network.

FIG. 3 is a schematic illustration of a comparison of orthogonal frequency division multiplexing (OFDM) and single-carrier frequency division multiplexing (SC-FDM) as may be implemented within a radio access network, such as the RAN 100 illustrated in FIG. 1. In some examples, this illustration may represent wireless resources as they may be allocated in an OFDM or SC-FDM system that utilizes MIMO. It should be understood that the concepts illustrated in FIG. 3 may also be applicable to a radio access network implementing OFDMA or SC-FDMA on an uplink channel.

In an OFDM system, a two-dimensional grid of resource elements (REs) may be defined by separation of frequency resources into closely spaced narrowband frequency tones or sub-carriers, and separation of time resources into a sequence of OFDM symbols having a given duration. In the example shown in FIG. 3, each RE is represented by a rectangle having the dimensions of one sub-carrier (e.g., 15 kHz bandwidth) by one OFDM symbol (e.g., 1/15 kHz=667 ms duration).

Thus, each RE represents a sub-carrier modulated for the OFDM symbol period by one OFDM data symbol. Each OFDM symbol may be modulated using, for example, quadrature phase shift keying (QPSK), 16 quadrature amplitude modulation (QAM), 64 QAM, or any other suitable modulation. For simplicity, only four sub-carriers over two OFDM symbol periods are illustrated. However, it should be understood that any number of sub-carriers and OFDM symbol periods may be utilized within a slot or subframe. For example, in LTE networks, a slot includes 12 contiguous sub-carriers and 7 consecutive OFDM symbols, or 84 resource elements. Within each OFDM symbol period, respective cyclic prefixes (CPs) may be inserted for each sub-carrier. The CP operates as a guard band between OFDM symbols and is typically generated by copying a small part of the end of an OFDM symbol to the beginning of the OFDM symbol.

By setting the spacing between the tones based on the symbol rate, inter-symbol interference can be reduced or eliminated. OFDM channels support high data rates by allocating a data stream in a parallel manner across multiple sub-carriers. However, OFDM suffers from high peak-to-average power ratio (PAPR), which can make OFDM undesirable on the uplink, where UE (scheduled entity) transmit power efficiency and amplifier cost are important factors.

In an SC-FDM system, a two-dimensional grid of resource elements (REs) may be defined by utilizing a wider bandwidth single carrier frequency, and separating the time resources into a sequence of SC-FDM symbols having a given duration. In the example shown in FIG. 3, a 60 kHz carrier is shown corresponding to the four 15 kHz sub-carriers in the OFDM system. In addition, although the OFDM and SC-FDM symbols have the same duration, each SC-FDM symbol contains N "Sub-Symbols" that represent the modulated data symbols. Thus, in the example shown in FIG. 3 with four modulated data symbols, in the OFDM system, the four modulated data symbols are transmitted in parallel (one per sub-carrier), while in the SC-FDM system, the four modulated data symbols are transmitted in series at four times the rate, with each data symbol occupying 4×15 kHz bandwidth.

By transmitting the N data symbols in series at N times the rate, the SC-FDM bandwidth is the same as the multi-carrier OFDM system; however, the PAPR is greatly reduced. In general, as the number of sub-carriers increases, the PAPR of the OFDM system approaches Gaussian noise statistics, but regardless of the number of sub-carriers, the SC-FDM PAPR remains substantially the same. Thus, SC-FDM may provide benefits on the uplink by increasing the transmit power efficiency and reducing the power amplifier cost.

Figure 4:
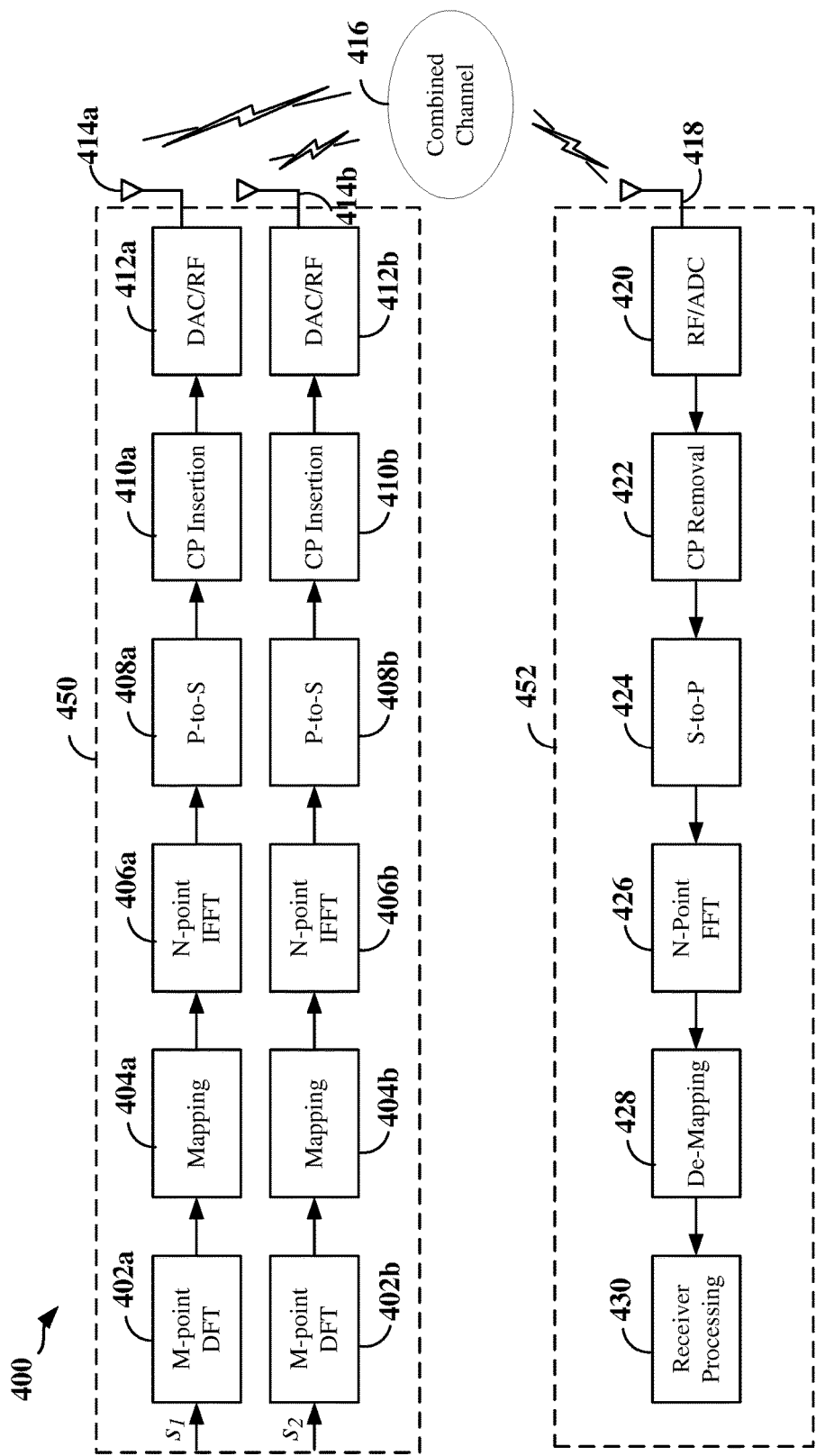
FIG. 4 is a diagram illustrating an SC-FDM system as may be implemented between a transmitter and a receiver within a radio access network according to some aspects of the disclosure.

FIG. 4 is a schematic illustration of an SC-FDM system 400 as may be implemented between a transmitter 450 and a receiver 452 within a radio access network, such as the RAN 100 shown in FIG. 1. In some examples, the transmitter 450 corresponds to a portion of a scheduled entity configured to transmit an uplink control channel (e.g., the PUCCH) containing uplink control information (UCI) and the receiver 452 corresponds to a scheduling entity configured to receive the uplink control channel. In the example shown in FIG. 4, the transmitter 450 includes two antennas 414a and 414b and the receiver 452 includes a single antenna 418. However, it should be understood that the transmitter 450 and receiver 452 may each include any number of antennas.

The SC-FDM system 400 illustrated in FIG. 4 is utilizing multiple-input multiple-output (MIMO) technology that enables the transmitter to achieve spatial transmit diversity and/or multiplexing by transmitting different streams of data ($s_1$ and $s_2$) simultaneously on the same time-frequency resources. The data streams $s_1$ and $s_2$ may contain the same or different data. Each data stream $s_1$ and $s_2$ may, for example, be of length M and be composed of complex modulated symbols generated from an original bit stream using a particular modulation scheme (e.g., QPSK, 16 QAM, 64 QAM, etc.). In some examples, the complex modulated symbols are modulated control symbols to be transmitted on an uplink control channel.

Each data stream $s_1$ and $s_2$ may be encoded (not shown) and input to a respective M-point discrete Fourier transform (DFT) 402a and 402b (corresponding to the length M of the data stream), which performs DFT precoding on the respective data streams $s_1$ and $s_2$. In general, each DFT 402a and 402b constructs a discrete frequency domain representation of the complex modulated symbols to produce precoded symbols. At the output of the DFTs 402a and 402b, the precoded symbols are then mapped onto the assigned sub-carriers by respective Mapping circuitry 404a and 404b to produce modulated sub-carriers. In some examples, the assigned sub-carriers form a set of contiguous tones. The modulated sub-carriers then pass through respective N-point inverse fast Fourier transforms (IFFTs) 406a and 406b for time domain conversion to produce respective SC-FDM sub-symbols, as shown in FIG. 3. In examples where the data streams $s_1$ and $s_2$ correspond to uplink control information, each SC-FDM sub-symbol may be referred to herein as an SC-FDM uplink control channel symbol. Multiple SC-FDM uplink control symbols (e.g., SC-FDM sub-symbols), each corresponding to one of the modulated control symbols, may be transmitted within an SC-FDM symbol, as shown in FIG. 3. Thus, one SC-FDM symbol carries M complex modulated symbols.

The SC-FDM sub-symbols output from the N-point IFFTs 406a and 406b pass through respective parallel-to-serial (P-to-S) converters 408a and 408b and cyclic prefix (CP) insertion circuitry 410a and 410b, where guard intervals (e.g., cyclic prefixes) are inserted between SC-FDM symbols (e.g., blocks of SC-FDM sub-symbols) in order to reduce inter-symbol interference (ISI) caused by multi-path propagation among the SC-FDM symbols. The SC-FDM symbols and CPs are then input to respective digital-to-analog converter (DAC)/radio frequency (RF) circuitry 412a and 412b for analog conversion and up-conversion of the respective analog signals to RF. The RF signals may then be transmitted via respective antennas 414a and 414b.

Each RF signal traverses a wireless channel 416 to the receiver 452, where the combined RF signals are received by the antenna 418, down-converted to baseband, and then converted to a digital signal by RF/analog-to-digital converter (ADC) circuitry 420. The digital signal may then be provided to CP Removal circuitry 422, where the CP is removed from between SC-FDM symbols. The SC-FDM symbols may then be input to a serial-to-parallel (S-to-P) converter 424 and an N-point fast Fourier transform (FFT) 426, where the time domain signal is transformed to a frequency domain signal. Sub-carrier de-mapping may then be performed by De-Mapping circuitry 428, and further signal processing may then be performed by Receiver Processing circuitry 430 to demodulate and decode the signal to produce the original bit stream.

Space-time block coding (STBC) is an encoding scheme utilized in wireless communications in which a data stream and one or more copies of a data stream are transmitted across two or more antennas. In STBC, a data stream is encoded in information blocks, which are then divided among the transmit antennas (in space) and transmitted across time. STBC is based on Alamouti's code, developed by Siavash Alamouti in 1998. Alamouti's code was designed for a two-transmit antenna system and has the coding matrix:

$$C_1 = \begin{bmatrix} c_0 & c_1 \\ -c_1^* & c_0^* \end{bmatrix},$$

where * denotes the complex conjugate.

Figure 5:
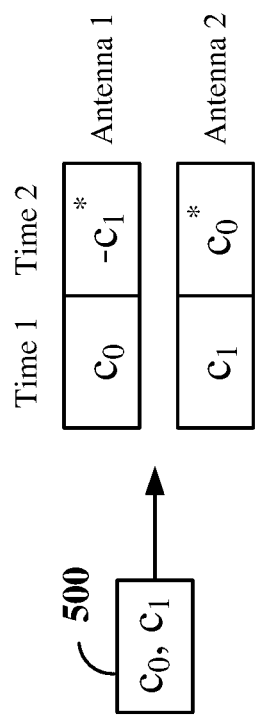
FIG. 5 is a diagram illustrating an example of space-time block coding (STBC) according to some aspects of the disclosure.

FIG. 5 is a schematic illustration of space-time block coding (STBC) information blocks of a data stream. In FIG. 5, a pair of two symbols $c_0$ and $c_1$ of a data stream are encoded together as an information block 500. At a higher layer, the exact same pair of symbols ($c_0$ and $c_1$) is transmitted via two transmit antennas over two symbol periods (e.g., SC-FDMA or OFDMA symbol periods). For example, during a first symbol period (Time 1), the symbols $c_0$ and $c_1$ are each provided to a respective transmit antenna without any modification. In the example shown in FIG. 5, symbol $c_0$ is provided to Antenna 1, while symbol $c_1$ is provided to Antenna 2.

However, during the next symbol period (Time 2), the symbols $c_0$ and $c_1$ are each mathematically transformed according to Alamouti's coding matrix above and mapped to different antennas. In the example shown in FIG. 5, symbol $c_0$ is transformed into the conjugate of $c_0$ and provided to Antenna 2, while symbol $c_1$ is transformed into the negative conjugate of $c_1$ and provided to Antenna 1. At the receiver, the symbols $c_0$ and $c_1$ are processed together (e.g., the receiver does not process the data at every symbol, but rather every other symbol). In general, the receiver combines the received symbols and then decodes each symbol separately using a mathematical process.

STBC exploits the received duplicate versions of the data symbols to improve the probability of recovering the symbols in any kind of channel condition. Thus, STBC may be utilized in an SC-FDMA system to improve the spatial transmit diversity on the uplink when a scheduled entity (UE) includes multiple transmit antennas, as shown in FIG. 4. However, STBC requires two paired SC-FDMA symbols to construct the STBC code blocks. In some scenarios, there may be only an odd number of SC-FDMA symbols within a particular slot or subframe. For example, PUCCH format 3 in LTE contains only five SC-FDMA symbols within a slot. In this case, an orphan symbol is created when applying a conventional STBC scheme.

Figure 6:
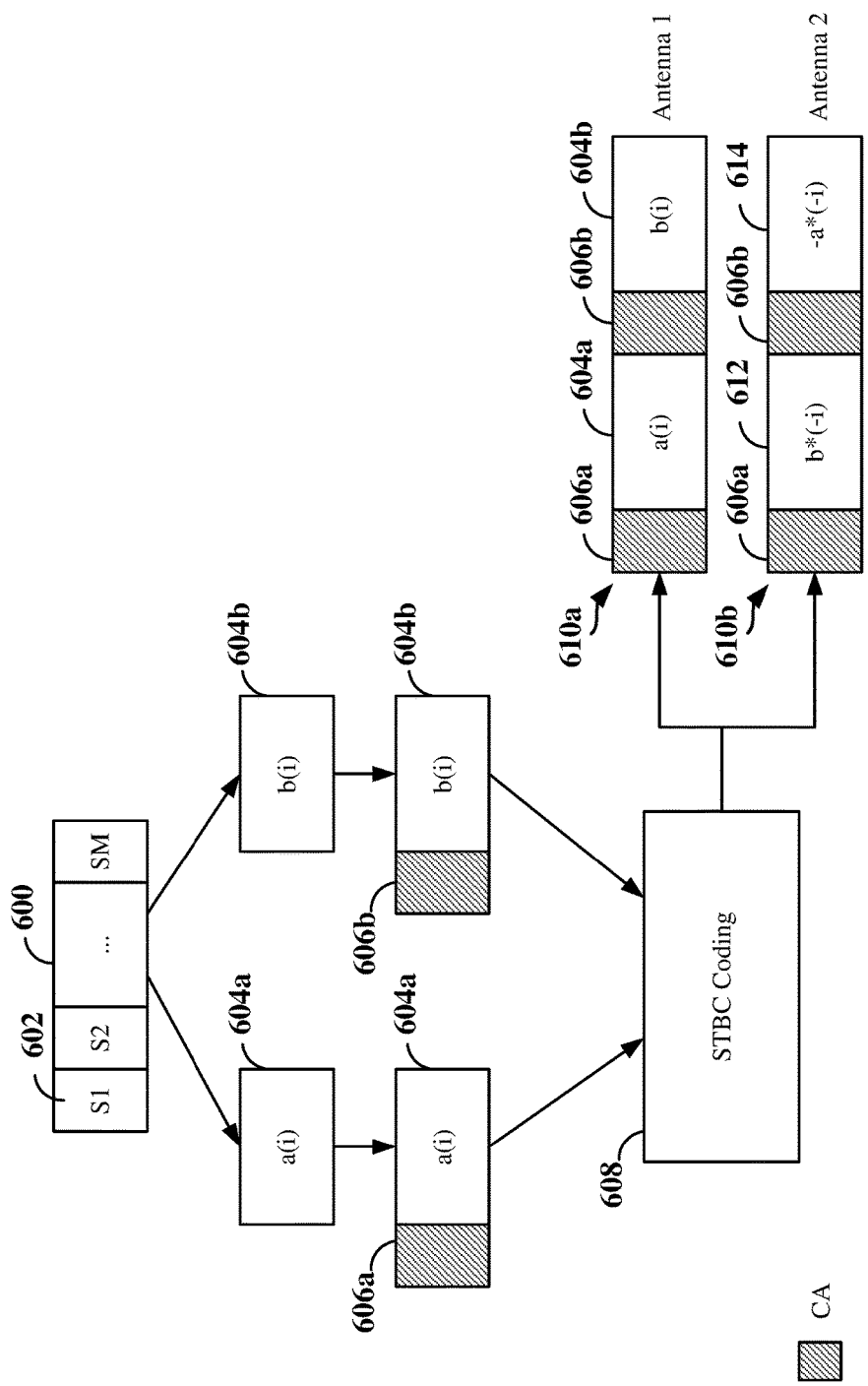
FIG. 6 is a diagram illustrating an example of one-symbol STBC according to some aspects of the disclosure.

Therefore, in various aspects of the disclosure, a one-symbol STBC scheme may be utilized to achieve transmit diversity even when an odd number of SC-FDMA symbols are transmitted within a slot. FIG. 6 is a schematic illustration of a one-symbol STBC mechanism. As shown in FIG. 6, an information block 600 containing M complex modulated symbols 602 (S1, S2, ... SM) may be divided into a first set of complex modulated symbols a(i) 604a and a second set of complex modulated symbols b(i) 604b. In accordance with various aspects of the disclosure, a respective cyclic prefix 606a and 606b may be added (appended) to each set of symbols a(i) and b(i). Each cyclic prefix 606a and 606b may include, for example, a portion of the end of the respective set of symbols. In some examples, a cyclic postfix (not shown) may also be added at the end of each set of symbols. Each cyclic postfix may include, for example, a portion of the beginning of the respective set of symbols. In other examples, a cyclic postfix may be added instead of the cyclic prefix. In some examples, the cyclic prefix or cyclic postfix may be set to zero instead of including a portion of the beginning/end of the set of symbols, depending on the desired performance and overhead.

The cyclic prefix and/or cyclic postfix, hereinafter referred to as a cyclic affix (CA), may be utilized by the receiver to identify the different sets of symbols (e.g., by utilizing the repeated portion as a marker for the beginning and ending of the set of symbols) and enable the receiver to perform space-time decoding. For example, if a cyclic postfix is appended to a set of symbols, the receiver may identify the cyclic postfix as a repeated portion of a set of symbols at an end thereof and utilize the repeated portion to determine the beginning and end of the set of symbols (e.g., the beginning of the set of symbols corresponds to the cyclic postfix (repeated portion) and the end of the set of symbols occurs immediately prior to the cyclic postfix).

The resulting information blocks (e.g., CA+a(i); CA+b(i)) may then be subjected to STBC coding circuitry 608 to perform Alamouti-type code processing to produce duplicate versions that are functions of the sets of symbols a(i) and b(i). In the example shown in FIG. 6, after encoding, two code blocks 610a and 610b are produced, each for transmission on a separate antenna. For example, the first code block 610a for transmission on Antenna 1 includes the original information blocks (e.g., sets of symbols a(i) 604a and b(i) 604b and CAs 606a and 606b). The second code block 610b for transmission on Antenna 2 includes the CAs 606a and 606b, $b^*(-i)$ 612, which is a complex conjugate of a modular of a number of modulated control symbols within b(i), and $-a^*(-i)$ 614, which is a negative complex conjugate of a modular of a number of modulated control symbols within a(i). At the receiver, standard space-time block decoding may be performed on the two code blocks 610a and 610b to recover the original sets of complex modulated symbols a(i) 604a and b(i) 604b.

In a multiple access system, where multiple scheduled entities are transmitting UCI on an uplink control channel, the number of scheduled entities that can transmit UCI in a particular slot may be limited using such a one-symbol STBC scheme. For example, each scheduled entity may time domain spread their UCI with a unique spreading code known to the scheduling entity to allow the scheduling entity to separate the received UCI and identify the scheduled entity that transmitted a particular UCI. If the scheduled entity uses multiple antennas to transmit the UCI without any special design (e.g., not using STBC), a separate spreading code may be used for each transmit antenna, thus reducing the number of spreading codes available for scheduled entities to use, and as a result, reducing the number of scheduled entities that may transmit during a particular slot.

Figure 7:
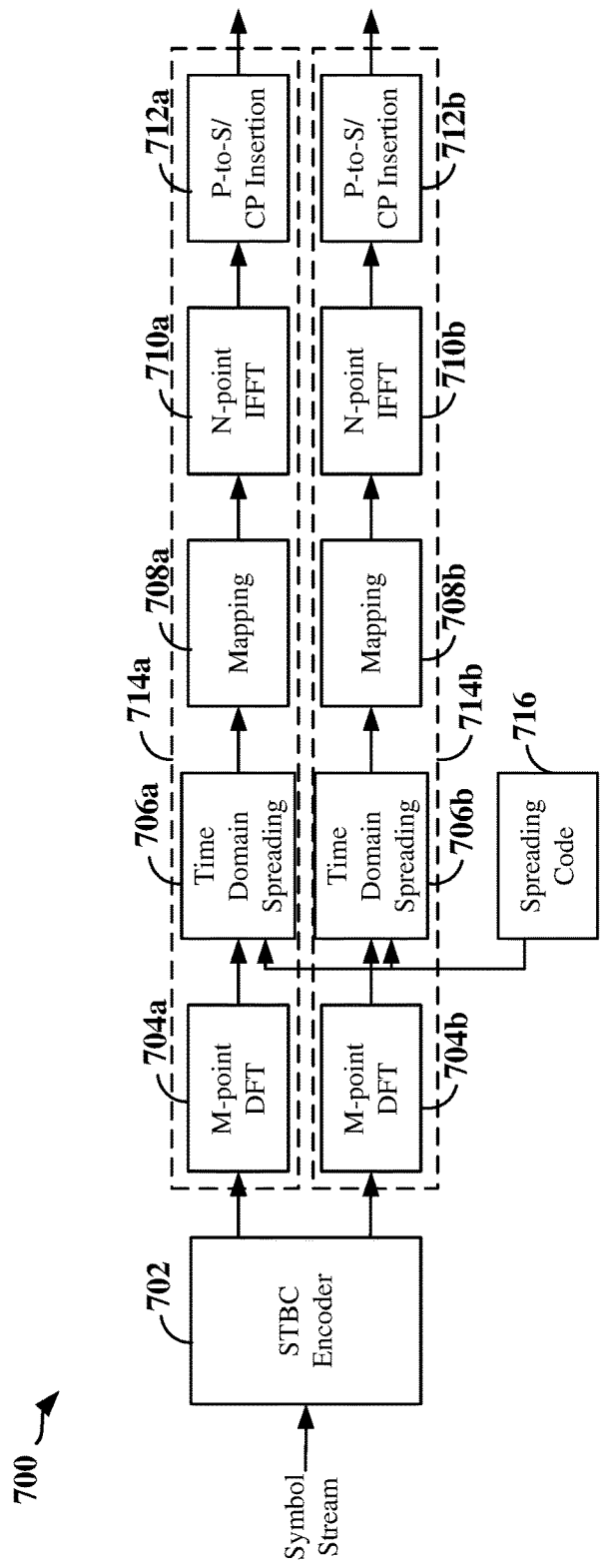
FIG. 7 is a diagram illustrating an example of a transmitter for generating SC-FDMA symbols containing uplink control information utilizing one-symbol STBC according to some aspects of the disclosure.

In various aspects of the disclosure, uplink control information (UCI) may be transmitted on an uplink control channel (e.g., PUCCH) using SC-FDMA and one-symbol STBC by time domain spreading each of the STBC code blocks over multiple SC-FDMA symbols and utilizing the same spreading code for each of the antennas. FIG. 7 is a schematic illustration of a portion of a transmitter 700 (e.g., in a scheduled entity) for generating SC-FDMA symbols containing uplink control information utilizing one-symbol STBC.

In FIG. 7, a symbol stream, which may be composed of a plurality of modulated control symbols generated using a particular modulation scheme (e.g., QPSK, 16 QAM, 64 QAM, etc.), may be input to an STBC encoder 702. The STBC encoder 702, as shown in FIG. 6, divides the symbol stream into two sets of modulated control symbols. The STBC encoder 702 then appends a respective cyclic affix (e.g., cyclic prefix and/or cyclic postfix) to each of the sets of modulated control symbols to produce two information blocks, where the combination of the two information blocks has a total length of M after adding the respective CAs. The two information blocks may then be encoded using space-time block coding, as also shown in FIG. 6, to produce two code blocks. Each of the code blocks may then be provided along a different transmitter chain 714a and 714b towards a different antenna. For example, the first code block may be provided along a first transmitter chain 714a towards a first antenna (not specifically shown in FIG. 7) and the second code block is provided along a second transmitter chain 714b towards a second antenna (not specifically shown in FIG. 7). As described above in connection with FIG. 6, the first code block for transmission on the first antenna may include the original information blocks, whereas the second code block for transmission on the second antenna may include the cyclic affixes and functions of each of the sets of modulated control symbols.

Each code block may then be input to a respective M-point discrete Fourier transform (DFT) 704a and 704b (corresponding to the length M of each code block), which performs DFT precoding on the respective code blocks to produce precoded symbols. At the output of the DFTs 704a and 704b, the precoded symbols may then be input to respective time domain spreading circuitry 706a and 706b to time domain spread the precoded symbols over a plurality of SC-FDMA symbols using a spreading code 716. In accordance with various aspects of the disclosure, each time domain spreading circuitry 706a and 706b utilizes the same spreading code 716. In some examples, the spreading code 716 may be a Pseudo Noise (PN) code, a Walsh code and/or a DFT code.

The spreading code 716 is characterized by the spreading factor, which indicates the symbol length of the spreading code. In some examples, the spreading factor (spreading code size) is limited by the number of SC-FDMA symbols utilized to transmit UCI in a slot. For example, if PUCCH format 3 is selected for transmission of UCI (here, the PUCCH format indicates the type of information included in the UCI with format 3 including hybrid automatic repeat request (HARQ) acknowledgement information), up to five SC-FDMA symbols may be used to transmit UCI in a slot when the network deploys normal CP numerology (e.g., normal CP length and subcarrier spacing) in LTE. In an LTE network, where each SC-FDMA symbol carries N complex modulated symbols (e.g., for PUCCH format 3, N=12), the output from each of the DFT blocks 704a and 704b may include N respective precoded symbols that may be time domain spread over five SC-FDMA symbols by the time domain spreading circuitry 706a and 706b. For example, each precoded symbol may be multiplied by a five symbol length spreading code Wi, where $W_i = [W_i(0), W_i(1), W_i(2), W_i(3), W_i(4)]$ and distributed over the time domain, such that each SC-FDMA symbol includes a time domain spread version of each of the N precoded symbols.

In some examples, one of the SC-FDMA symbols may be used to transmit a reference signal (RS) instead of UCI. In this example, the precoded symbols output from the DFTs 704a and 704b may be time domain spread over the remaining four symbols using a four-symbol length spreading code. In general, the number of RS and control data symbols used for control channel transmission may be dependent on the user multiplexing capability as well as the RS signal processing gain. For example, M symbols may be used for RS, while the remaining N-M symbols may be used for control data. In this example, time domain spreading is performed on the N-M control data symbols.

The time domain spread symbols for each SC-FDMA symbol may then be mapped onto the assigned sub-carriers by respective Mapping circuitry 708*a* and 708*b* to produce modulated sub-carriers. For example, at an initial time, the portion of the time domain spread symbols corresponding to a first SC-FDMA symbol may be mapped onto the assigned sub-carriers, followed by the time domain spread symbols corresponding to each of the other SC-FDMA symbols in the slot at subsequent times. The modulated sub-carriers for each SC-FDMA symbol in the slot then sequentially pass through respective N-point inverse fast Fourier transforms (IFFTs) 710*a* and 710*b* for time domain conversion to produce respective SC-FDMA sub-symbols for each of the time domain spread SC-FDMA symbols, as shown in FIG. 3. As discussed above in connection with FIG. 4, each SC-FDMA sub-symbol may be referred to herein as an SC-FDMA uplink control channel symbol, and multiple SC-FDMA uplink control symbols (e.g., SC-FDMA sub-symbols), each corresponding to one of the time domain spread precoded symbols, may be transmitted within an SC-FDMA symbol, as shown in FIG. 3.

The SC-FDMA sub-symbols output from the N-point IFFTs 710*a* and 710*b* then sequentially pass through respective parallel-to-serial (P-to-S) converters/CP insertion circuitry 712*a* and 712*b*, where guard intervals (e.g., cyclic prefixes) are inserted between SC-FDMA symbols (e.g., blocks of SC-FDMA sub-symbols) in order to reduce inter-symbol interference (ISI) caused by multi-path propagation among the SC-FDMA symbols. The SC-FDMA symbols and CPs may then be converted to analog signals and up-converted to radio frequency for transmission via respective antennas.

In some examples, the transmitter 700 may include more than two antennas, which may be utilized to achieve transmit time diversity in addition to the transmit spatial diversity realized with STBC. For example, in a transmitter with four antennas, a cyclic shift delay, such as that produced using a small delay cyclic delay diversity process, may be applied to each of the SC-FDMA symbols transmitted on a first antenna, and the resulting cyclic shifted SC-FDMA symbols may be transmitted on a third antenna. In addition, a similar cyclic shift delay may be applied to each of the SC-FDMA symbols transmitted on a second antenna and the resulting cyclic shifted SC-FDMA symbols may be transmitted on a fourth antenna.

Figure 8:
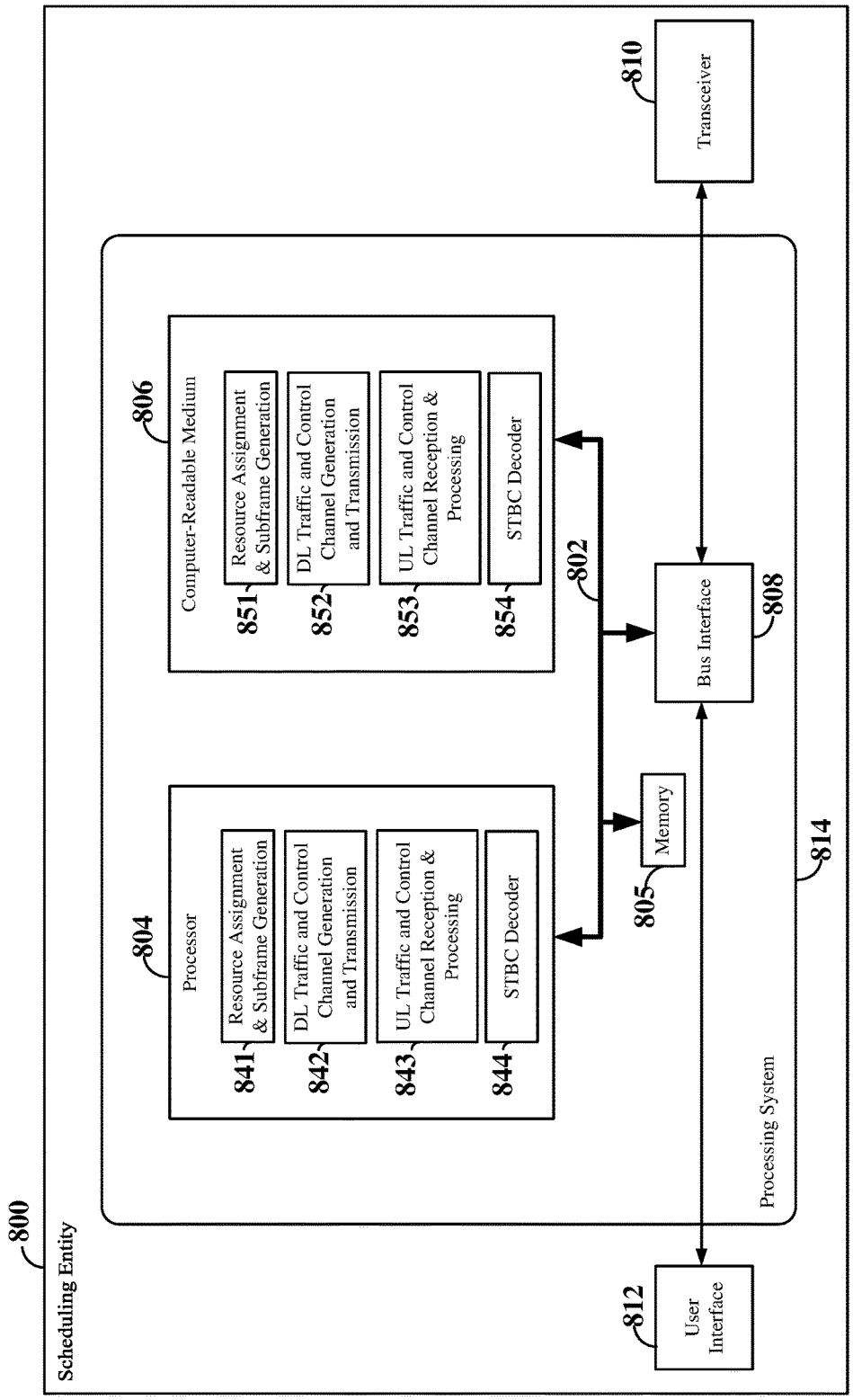
FIG. 8 is a block diagram illustrating an example of a hardware implementation for a scheduling entity apparatus employing a processing system according to some aspects of the disclosure.

FIG. 8 is a diagram illustrating an example of a hardware implementation for a scheduling entity 800 employing a processing system 814. For example, the scheduling entity 800 may be a user equipment (UE) as illustrated in any one or more of FIGS. 1 and/or 2. In another example, the scheduling entity 800 may be a base station as illustrated in any one or more of FIGS. 1 and/or 2.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes and procedures described below. The processor 804 may in some instances be implemented via a baseband or modem chip and in other implementations, the processor 804 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer.

The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include resource assignment and scheduling circuitry 841, configured to generate, schedule, and modify a resource assignment or grant of time-frequency resources (e.g., a set of one or more resource elements). For example, the resource assignment and scheduling circuitry 841 may schedule time-frequency resources within a plurality of time division duplex (TDD) and/or frequency division duplex (FDD) subframes or slots to carry user data traffic and/or control information to and/or from multiple UEs (scheduled entities). The resource assignment and scheduling circuitry 841 may further operate in coordination with resource assignment and scheduling software 851.

The processor 804 may further include downlink (DL) traffic and control channel generation and transmission circuitry 842, configured to generate and transmit downlink user data traffic and control signals/channels. For example, the DL traffic and control channel generation and transmission circuitry 842 may be configured to generate a physical downlink control channel (PDCCH) including downlink control information and/or a physical downlink shared channel (PDSCH) including downlink user data traffic. In addition, the DL traffic and control channel generation and transmission circuitry 842 may operate in coordination with the resource assignment and scheduling circuitry 841 to schedule the DL user data traffic and/or control information and to place the DL user data traffic and/or control information onto a time division duplex (TDD) or frequency division duplex (FDD) carrier within one or more subframes or slots in accordance with the resources assigned to the DL user data traffic and/or control information. The DL traffic and control channel generation and transmission circuitry 842 may further be configured to multiplex DL transmissions utilizing time division multiplexing (TDM), code division multiplexing (CDM), frequency division multiplexing (FDM), orthogonal frequency division multiplexing (OFDM), sparse code multiplexing (SCM), or other suitable multiplexing schemes. The DL traffic and control channel generation and transmission circuitry 842 may further operate in coordination with DL data and control channel generation and transmission software 852.

The processor 804 may further include uplink (UL) traffic and control channel reception and processing circuitry 843, configured to receive and process uplink control channels and uplink traffic channels from one or more scheduled entities. For example, the UL traffic and control channel reception and processing circuitry 843 may be configured to receive uplink user data traffic from one or more scheduled entities. The UL traffic and control channel reception and processing circuitry 843 may further be configured to receive a Physical Uplink Control Channel (PUCCH) containing multiplexed uplink control information (UCI) from multiple scheduled entities.

In accordance with various aspects of the disclosure, the PUCCH may be transmitted using SC-FDMA with one-symbol STBC. The UL traffic and control channel reception and processing circuitry 843 may be configured to receive the PUCCH including a plurality of SC-FDMA symbols, remove the CA between the SC-FDMA symbols, and time domain de-spread the SC-FDMA symbols received within a slot to identify two STBC code blocks having the same spreading code. The UL traffic and control channel reception and processing circuitry 843 may further utilize STBC decoder circuitry 844 to space-time block decode over the two STBC code blocks to produce a plurality of modulated control symbols. The UL traffic and control channel reception and processing circuitry 843 may further demodulate the plurality of modulated control symbols to recover the original control data (e.g., set of control information bits). The UL traffic and control channel reception and processing circuitry 843 may further operate in coordination with UL traffic and control channel reception and processing software 853. In addition, the STBC decoder circuitry 844 may further operate in coordination with STBC decoder software 854.

The circuitry included in the processor 804 is provided as non-limiting examples. Other means for carrying out the described functions exists and is included within various aspects of the present disclosure. In some aspects of the disclosure, the computer-readable medium 806 may store computer-executable code with instructions configured to perform various processes described herein. The instructions included in the computer-readable medium 806 are provided as non-limiting examples. Other instructions configured to carry out the described functions exist and are included within various aspects of the present disclosure.

Figure 9:
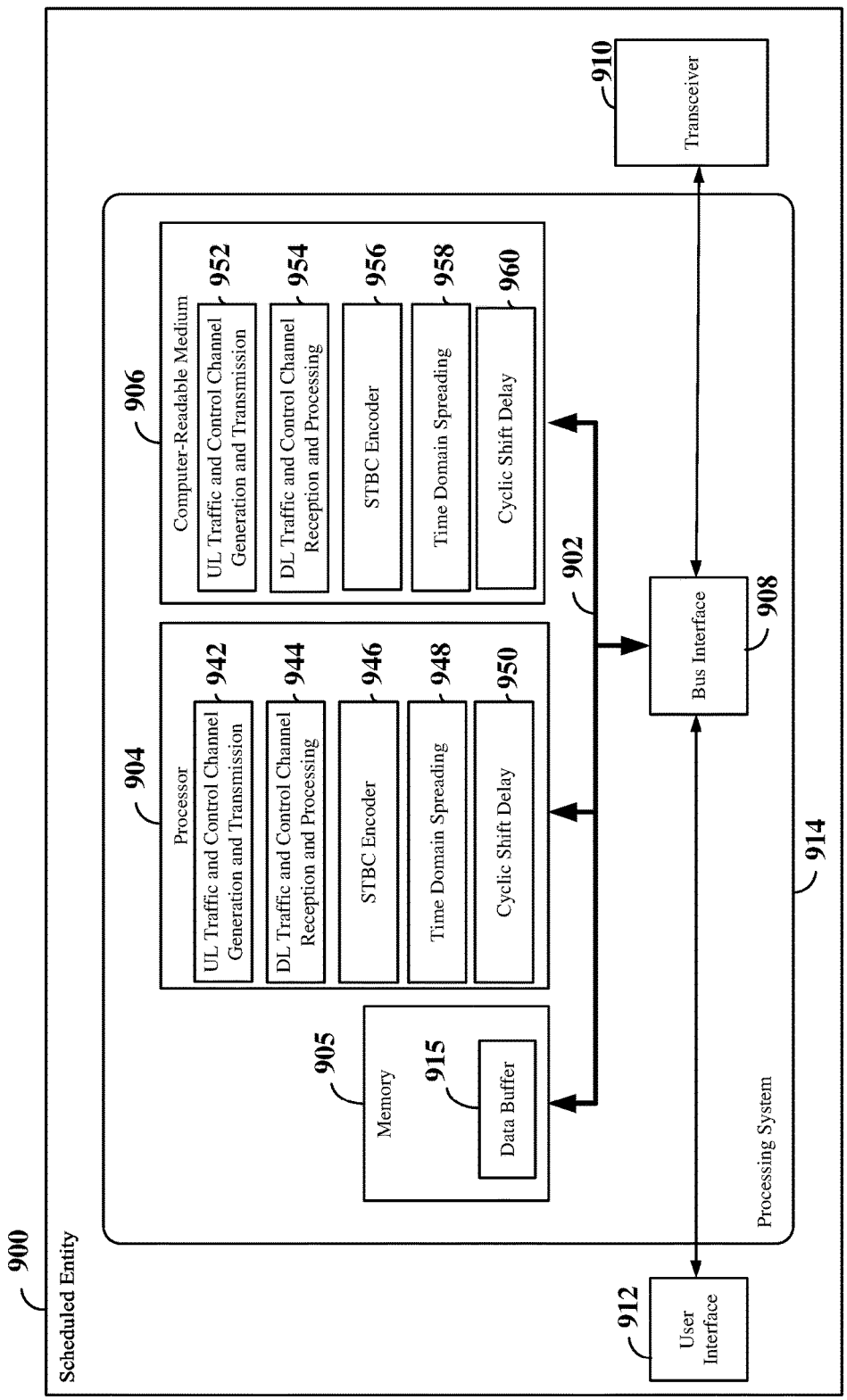
FIG. 9 is a block diagram illustrating an example of a hardware implementation for a scheduled entity apparatus employing a processing system according to some aspects of the disclosure.

FIG. 9 is a conceptual diagram illustrating an example of a hardware implementation for an exemplary scheduled entity 900 employing a processing system 914. In accordance with various aspects of the disclosure, an element, or any portion of an element, or any combination of elements may be implemented with a processing system 914 that includes one or more processors 904. For example, the scheduled entity 900 may be a user equipment (UE) as illustrated in any one or more of FIGS. 1 and/or 2.

The processing system 914 may be substantially the same as the processing system 814 illustrated in FIG. 9, including a bus interface 908, a bus 902, memory 905, a processor 904, and a computer-readable medium 906. Furthermore, the scheduled entity 900 may include a user interface 912 and a transceiver 910 substantially similar to those described above in FIG. 8. That is, the processor 904, as utilized in a scheduled entity 900, may be used to implement any one or more of the processes described below.

In some aspects of the disclosure, the processor 904 may include uplink (UL) traffic and control channel generation and transmission circuitry 942, configured to generate and transmit uplink control/feedback/acknowledgement information on an UL control channel. For example, the UL traffic and control channel generation and transmission circuitry 942 may be configured to generate and transmit uplink user data traffic on an UL traffic channel (e.g., a PUSCH) in accordance with an uplink grant. The UL traffic and control channel generation and transmission circuitry 942 may further be configured to generate and transmit an uplink control channel (e.g., a Physical Uplink Control Channel (PUCCH) containing uplink control information (UCI).

In accordance with various aspects of the disclosure, the UL traffic and control channel generation and transmission circuitry 942 may be configured to generate control information bits corresponding to the uplink control information and modulate the control information bits (e.g., using QPSK, 16 QAM, 64 QAM, etc.) to produce modulated control symbols. The UL traffic and control channel generation and transmission circuitry 942 may further be configured to encode the uplink control information utilizing STBC encoder circuitry 946 to produce two code blocks, each for transmission via a respective antenna. In some examples, the STBC encoder circuitry 946 may operate in accordance with the functionality of the STBC encoder 702 described above in connection with FIG. 7.

The UL traffic and control channel generation and transmission circuitry 942 may further be configured to perform a DFT on each of the code blocks to produce respective sets of precoded symbols, and then time domain spread each of the sets of precoded symbols utilizing time domain spreading circuitry 948 to produce respective time domain spread signals. In some examples, the time domain spreading circuitry 948 may operate in accordance with the functionality of the time domain spreading circuitry 706a and 706b described above in connection with FIG. 7. The UL traffic and control channel generation and transmission circuitry 942 may further be configured to generate respective sets of SC-FDMA symbols from the respective time domain spread signals and to output each of the sets of SC-FDMA symbols to the transceiver 910 for transmission via respective antennas.

The UL traffic and control channel generation and transmission circuitry 942 may further utilize cyclic shift delay circuitry 950 to apply a cyclic shift delay, such as that produced using a small delay cyclic delay diversity process, to each of the SC-FDMA symbols transmitted on a first antenna, and the resulting cyclic shifted SC-FDMA symbols may be output to the transceiver 910 for transmission on a third antenna. In addition, the cyclic shift delay circuitry 950 may further apply a similar cyclic shift delay to each of the SC-FDMA symbols transmitted on a second antenna and the resulting cyclic shifted SC-FDMA symbols may be output to the transceiver 910 for transmission on a fourth antenna. If more than four transmit antennas are utilized, a different cyclic shift may be applied to the SC-FDMA symbols for each pair of transmit antennas.

The UL traffic and control channel generation and transmission circuitry 942 may operate in coordination with UL traffic and control channel generation and transmission software 952. In addition, the STBC encoder circuitry 946 may operate in coordination with STBC encoder software 956. Furthermore, the time domain spreading circuitry 948 may operate in coordination with time domain spreading software 958. Similarly, the cyclic shift delay circuitry 950 may operate in coordination with cyclic shift delay software 960.

The processor 904 may further include downlink (DL) traffic and control channel reception and processing circuitry 944, configured for receiving and processing downlink user data traffic on a traffic channel (e.g., PDSCH), and to receive and process control information on one or more downlink control channels. In some examples, received downlink user data traffic and/or control information may be temporarily stored in a data buffer 915 within memory 905. The DL traffic and control channel reception and processing circuitry 944 may operate in coordination with DL traffic and control channel reception and processing software 954.

The circuitry included in the processor 904 is provided as non-limiting examples. Other means for carrying out the described functions exists and is included within various aspects of the present disclosure. In some aspects of the disclosure, the computer-readable medium 906 may store computer-executable code with instructions configured to perform various processes described herein. The instructions included in the computer-readable medium 906 are provided as non-limiting examples. Other instructions configured to carry out the described functions exist and are included within various aspects of the present disclosure.

Figure 10:
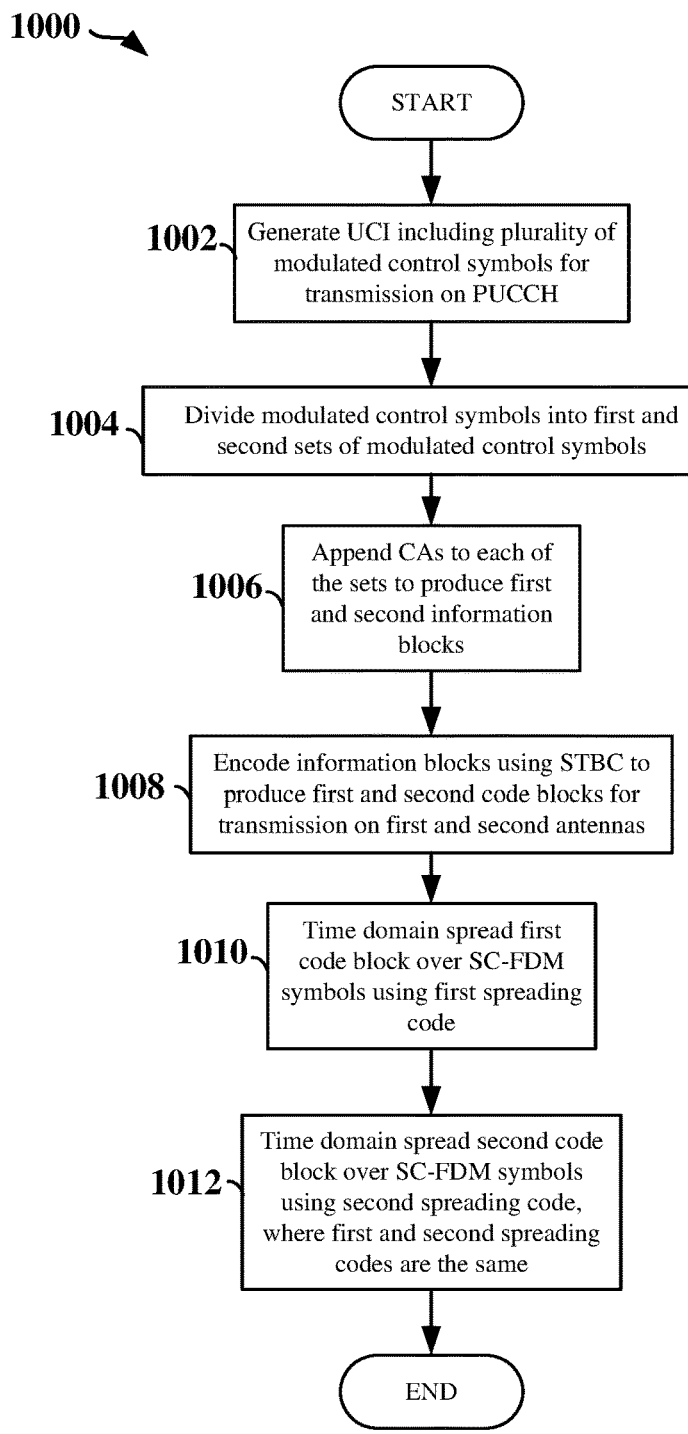
FIG. 10 is a flow chart illustrating an exemplary process for generating uplink control information for transmission on an uplink control channel utilizing SC-FDMA with one-symbol STBC, according to some aspects of the disclosure.

FIG. 10 is a flow chart illustrating an exemplary process 1000 for generating uplink control information for transmission on an uplink control channel utilizing SC-FDMA with one-symbol STBC, according to some aspects of the disclosure. As described below, some or all illustrated features may be omitted in a particular implementation within the scope of the present disclosure, and some illustrated features may not be required for implementation of all embodiments. In some examples, the process 1000 may be carried out by the scheduled entity 900 illustrated in FIG. 9. In some examples, the process 1000 may be carried out by any suitable apparatus or means for carrying out the functions or algorithm described below.

At block 1002, the scheduled entity may generate uplink control information (UCI) including a plurality of modulated control symbols for transmission on an uplink control channel (e.g., PUCCH). For example, the UL traffic and control channel generation and transmission circuitry 942 shown and described above in connection with FIG. 9 may generate the UCI.

At block 1004, the scheduled entity may divide the plurality of modulated control symbols into two sets of modulated control symbols (e.g., a first set of modulated control symbols and a second set of modulated control symbols). At block 1006, the scheduled entity may then append respective cyclic affixes (e.g., cyclic prefixes and/or cyclic postfixes) to each of the sets of modulated control symbols to produce respective first and second information blocks, where the combination of the first and second information blocks has a total length of M. The CA may be zero or nonzero. For example, the UL traffic and control channel generation and transmission circuitry 942 together with the STBC encoder circuitry 946 shown and described above in connection with FIG. 9 may divide the modulated control symbols and append the CAs to produce the first and second information blocks.

At block 1008, the scheduled entity may encode the first and second information blocks using space-time block coding to produce a first code block for transmission via a first antenna and a second code block for transmission via a second antenna. In some examples, the first code block for transmission via a first antenna may include the original information blocks, whereas the second code block for transmission via the second antenna may include the cyclic affixes and functions of each of the sets of modulated control symbols. For example, the UL traffic and control channel generation and transmission circuitry 942 together with the STBC encoder circuitry 946 shown and described above in connection with FIG. 9 may encode the first and second information blocks to produce the first and second code blocks.

At block 1010, the first code block may be time domain spread over a plurality of SC-FDMA symbols utilizing a first spreading code. In some examples, the first code block may be input to an M-point discrete Fourier transform (DFT) to produce precoded symbols, and the precoded symbols may then be time domain spread over the plurality of SC-FDMA symbols for transmission via the first antenna. For example, the UL traffic and control channel generation and transmission circuitry 942 together with the time domain spreading circuitry 948 shown and described above in connection with FIG. 9 may time domain spread the first code block over the plurality of SC-FDMA symbols.

At block 1012, the second code block may also be time domain spread over a plurality of SC-FDMA symbols utilizing a second spreading code. In accordance with various aspects of the disclosure, the second spreading code is the same as the first spreading code. In some examples, the second code block may be input to an M-point discrete Fourier transform (DFT) to produce precoded symbols, and the precoded symbols may then be time domain spread over the plurality of SC-FDMA symbols for transmission via the second antenna. For example, the UL traffic and control channel generation and transmission circuitry 942 together with the time domain spreading circuitry 948 shown and described above in connection with FIG. 9 may time domain spread the second code block over the plurality of SC-FDMA symbols.

Figure 11:
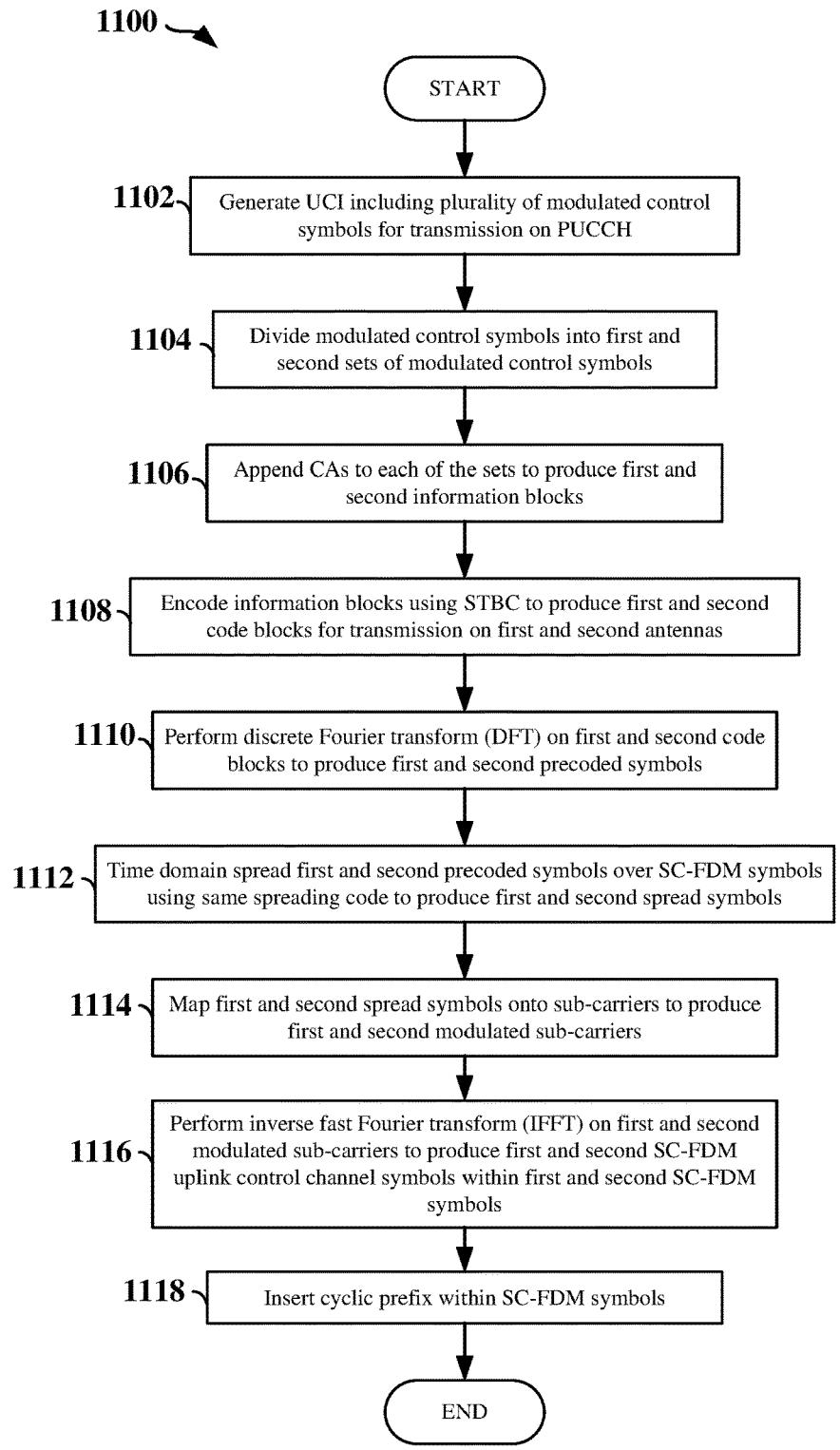
FIG. 11 is a flow chart illustrating another exemplary process for generating uplink control information for transmission on an uplink control channel utilizing SC-FDMA with one-symbol STBC, according to some aspects of the disclosure.

FIG. 11 is a flow chart illustrating another exemplary process 1100 for generating uplink control information for transmission on an uplink control channel utilizing SC-FDMA with one-symbol STBC, according to some aspects of the disclosure. As described below, some or all illustrated features may be omitted in a particular implementation within the scope of the present disclosure, and some illustrated features may not be required for implementation of all embodiments. In some examples, the process 1100 may be carried out by the scheduled entity 900 illustrated in FIG. 9. In some examples, the process 1100 may be carried out by any suitable apparatus or means for carrying out the functions or algorithm described below.

At block 1102, the scheduled entity may generate uplink control information (UCI) including a plurality of modulated control symbols for transmission on an uplink control channel (e.g., PUCCH). For example, the UL traffic and control channel generation and transmission circuitry 942 shown and described above in connection with FIG. 9 may generate the UCI.

At block 1104, the scheduled entity may divide the plurality of modulated control symbols into two sets of modulated control symbols (e.g., a first set of modulated control symbols and a second set of modulated control symbols). At block 1106, the scheduled entity may then append respective cyclic affixes (e.g., cyclic prefixes and/or cyclic postfixes) to each of the sets of modulated control symbols to produce respective first and second information blocks, where the combination of the first and second information blocks has a total length of M. For example, the UL traffic and control channel generation and transmission circuitry 942 together with the STBC encoder circuitry 946 shown and described above in connection with FIG. 9 may divide the modulated control symbols and append the CAs to produce the first and second information blocks.

At block 1108, the scheduled entity may encode the first and second information blocks using space-time block coding to produce a first code block for transmission via a first antenna and a second code block for transmission via a second antenna. In some examples, the first code block for transmission via a first antenna may include the original information blocks, whereas the second code block for transmission via the second antenna may include the cyclic affixes and functions of each of the sets of modulated control symbols. For example, the UL traffic and control channel generation and transmission circuitry 942 together with the STBC encoder circuitry 946 shown and described above in connection with FIG. 9 may encode the first and second information blocks to produce the first and second code blocks.

At block 1110, the scheduled entity may perform discrete Fourier transform (DFT) on the first and second code blocks to produce first and second precoded symbols. For example, the scheduled entity may construct a discrete frequency domain representation of the complex modulated symbols to produce the precoded symbols. For example, the UL traffic and control channel generation and transmission circuitry 942 shown and described above in connection with FIG. 9 may perform DFT on the first and second code blocks.

At block 1112, the scheduled entity may time domain spread the first and second precoded symbols over a plurality of SC-FDMA symbols utilizing the same spreading code to produce first and second spread symbols. For example, the UL traffic and control channel generation and transmission circuitry 942 together with the time domain spreading circuitry 948 shown and described above in connection with FIG. 9 may time domain spread the first and second precoded symbols over the plurality of SC-FDMA symbols.

At block 1114, the scheduled entity may map the first and second spread symbols onto sub-carriers to produce first and second modulated sub-carriers. In some examples, the assigned sub-carriers form a set of contiguous tones. For example, the UL traffic and control channel generation and transmission circuitry 942 shown and described above in connection with FIG. 9 may map the spread symbols onto sub-carriers.

At block 1116, the scheduled entity may perform inverse fast Fourier transform (IFFT) on the first and second modulated sub-carriers for time domain conversion to produce first and second SC-FDMA uplink control channel symbols within first and second SC-FDMA symbols. Multiple SC-FDMA uplink control channel symbols (e.g., SC-FDMA sub-symbols), each corresponding to one of the modulated control symbols, may be transmitted within an SC-FDMA symbol, as shown in FIG. 3. Thus, each SC-FDMA symbol includes M SC-FDMA uplink control channel symbols. As an example, a portion of the first spread symbols may be mapped onto sub-carriers and subjected to IFFT to produce the SC-FDMA uplink control channel symbols within one of the first SC-FDMA symbols. Similarly, a portion of the second spread symbols may be mapped onto sub-carrier and subjected to IFFT to produce the SC-FDMA uplink control channel symbols within one of the second SC-FDMA symbols. For example, the UL traffic and control channel generation and transmission circuitry 942 shown and described above in connection with FIG. 9 may perform IFFT on the modulated sub-carriers.

At block 1118, the scheduled entity may insert a respective cyclic prefix (CP) into each of the SC-FDMA symbols (e.g., each of the first and second SC-FDMA symbols). For example, the UL traffic and control channel generation and transmission circuitry 942 shown and described above in connection with FIG. 9 may insert the CP into the SC-FDMA symbols.

Figure 12:
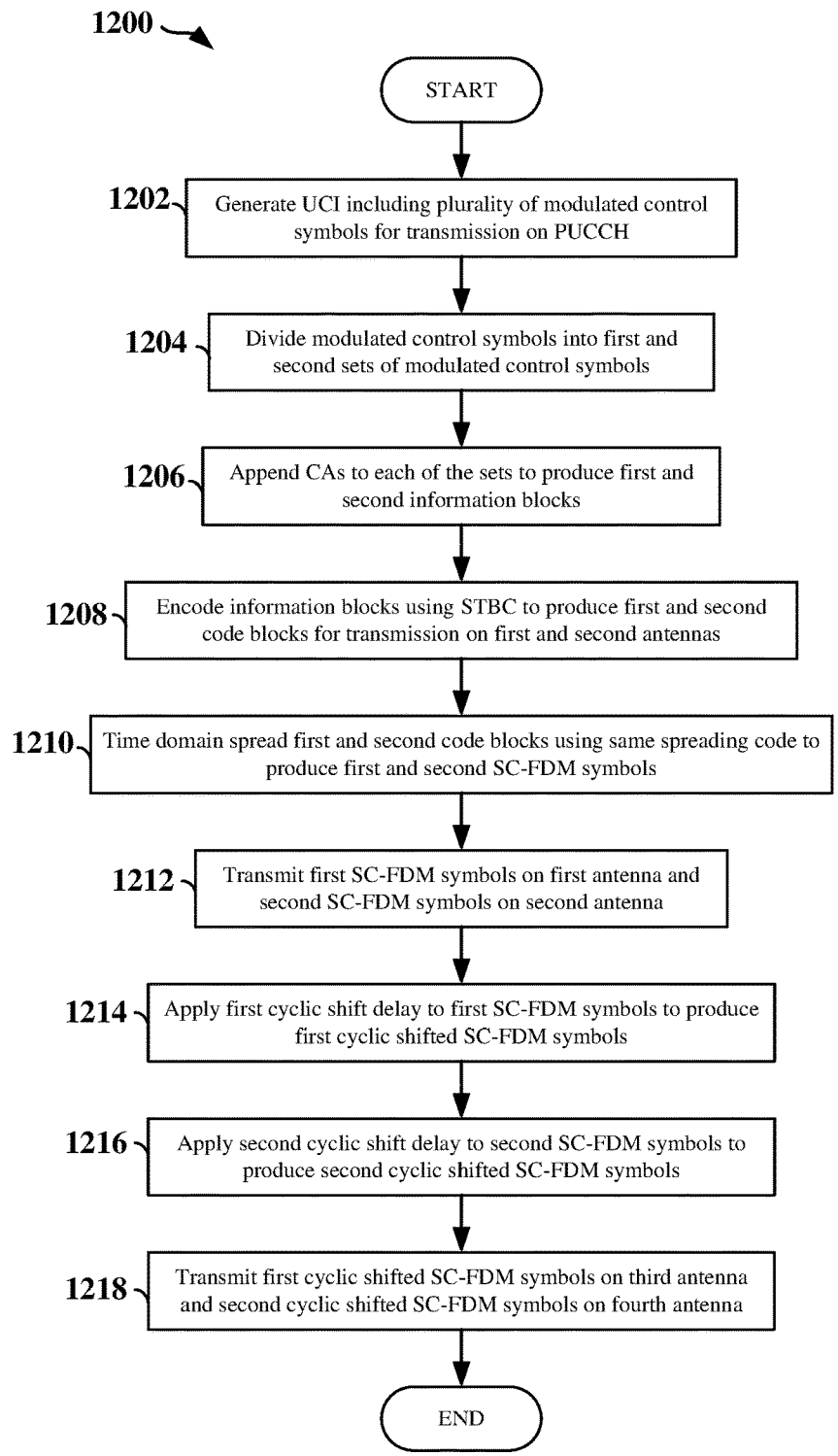
FIG. 12 is a flow chart illustrating another exemplary process for generating uplink control information for transmission on an uplink control channel utilizing SC-FDMA with one-symbol STBC, according to some aspects of the disclosure.

FIG. 12 is a flow chart illustrating another exemplary process 1200 for generating uplink control information for transmission on an uplink control channel utilizing SC-FDMA with one-symbol STBC, according to some aspects of the disclosure. As described below, some or all illustrated features may be omitted in a particular implementation within the scope of the present disclosure, and some illustrated features may not be required for implementation of all embodiments. In some examples, the process 1200 may be carried out by the scheduled entity 900 illustrated in FIG. 9.

In some examples, the process 1200 may be carried out by any suitable apparatus or means for carrying out the functions or algorithm described below.

At block 1202, the scheduled entity may generate uplink control information (UCI) including a plurality of modulated control symbols for transmission on an uplink control channel (e.g., PUCCH). For example, the UL traffic and control channel generation and transmission circuitry 942 shown and described above in connection with FIG. 9 may generate the UCI.

At block 1204, the scheduled entity may divide the plurality of modulated control symbols into two sets of modulated control symbols (e.g., a first set of modulated control symbols and a second set of modulated control symbols). At block 1206, the scheduled entity may then append respective cyclic affixes (e.g., cyclic prefixes and/or cyclic postfixes) to each of the sets of modulated control symbols to produce respective first and second information blocks, where the combination of the first and second information blocks has a total length of M. For example, the UL traffic and control channel generation and transmission circuitry 942 together with the STBC encoder circuitry 946 shown and described above in connection with FIG. 9 may divide the modulated control symbols and append the CAs to produce the first and second information blocks.

At block 1208, the scheduled entity may encode the first and second information blocks using space-time block coding to produce a first code block for transmission via a first antenna and a second code block for transmission via a second antenna. In some examples, the first code block for transmission via a first antenna may include the original information blocks, whereas the second code block for transmission via the second antenna may include the cyclic affixes and functions of each of the sets of modulated control symbols. For example, the UL traffic and control channel generation and transmission circuitry 942 together with the STBC encoder circuitry 946 shown and described above in connection with FIG. 9 may encode the first and second information blocks to produce the first and second code blocks.

At block 1210, the scheduled entity may time domain spread the first and second code blocks over a plurality of SC-FDMA symbols utilizing the same spreading code to produce first and second SC-FDMA symbols. For example, the UL traffic and control channel generation and transmission circuitry 942 together with the time domain spreading circuitry 948 shown and described above in connection with FIG. 9 may time domain spread the first and second code blocks over the plurality of SC-FDMA symbols.

At block 1212, the scheduled entity may transmit the first SC-FDMA symbols on a first antenna and the second SC-FDMA symbols on a second antenna. For example, the UL traffic and control channel generation and transmission circuitry 942 together with the transceiver 910 shown and described above in connection with FIG. 9 may transmit the first and second SC-FDMA symbols on first and second antennas, respectively.

At block 1214, the scheduled entity may apply a first cyclic shift delay to the first SC-FDMA symbols to produce first cyclic shifted SC-FDMA symbols. For example, the UL traffic and control channel generation and transmission circuitry 942 together with the cyclic shift delay circuitry 950 shown and described above in connection with FIG. 9 may apply the first cyclic shift delay to the first SC-FDMA symbols.

At block 1216, the scheduled entity may apply a second cyclic shift delay to the second SC-FDMA symbols to produce second cyclic shifted SC-FDMA symbols. The second cyclic shift delay may be the same as or different from the first cyclic shift delay. For example, the UL traffic and control channel generation and transmission circuitry 942 together with the cyclic shift delay circuitry 950 shown and described above in connection with FIG. 9 may apply the second cyclic shift delay to the second SC-FDMA symbols.

At block 1218, the scheduled entity may transmit the first cyclic shifted SC-FDMA symbols on a third antenna and the second cyclic shifted SC-FDMA symbols on a fourth antenna. For example, the UL traffic and control channel generation and transmission circuitry 942 together with the transceiver 910 shown and described above in connection with FIG. 9 may transmit the first and second cyclic shifted SC-FDMA symbols on third and fourth antennas, respectively.

Figure 13:
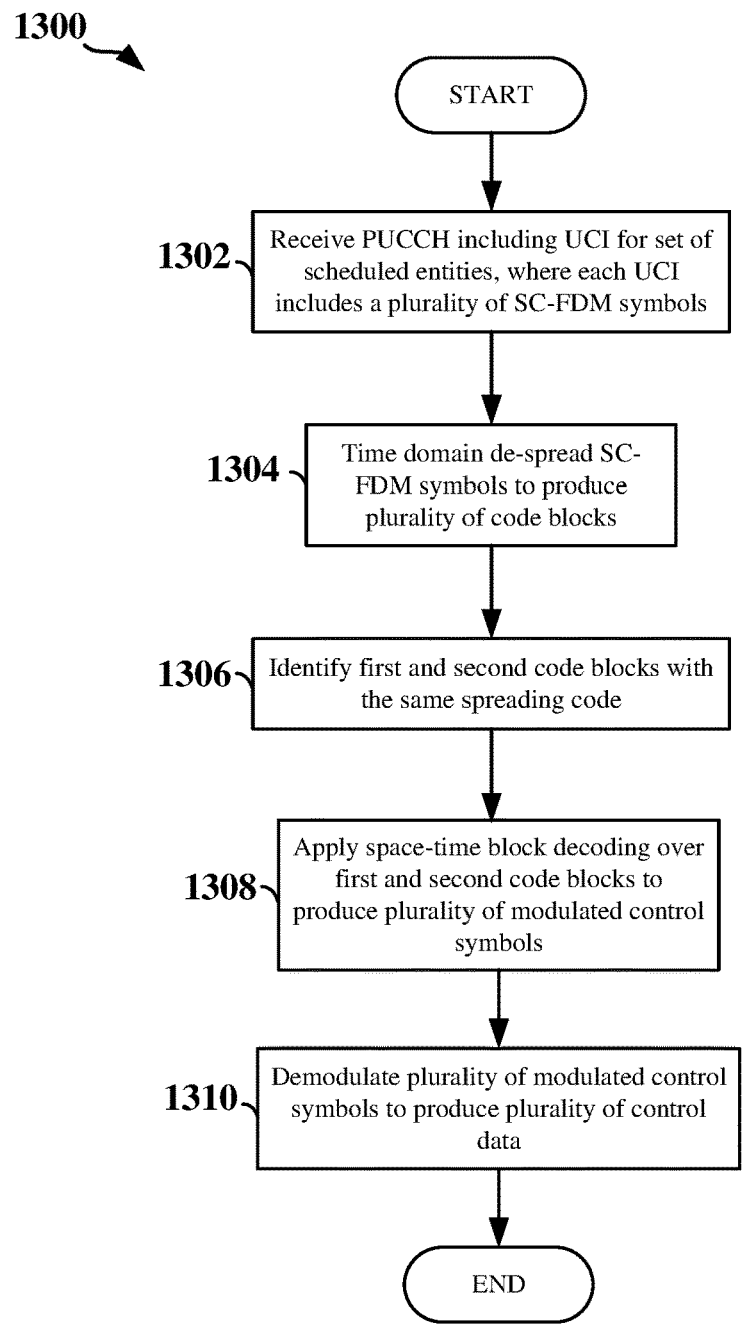
FIG. 13 is a flow chart illustrating an exemplary process for receiving and processing a PUCCH including UCI generated using SC-FDMA and one-symbol STBC, according to some aspects of the disclosure.

FIG. 13 is a flow chart illustrating an exemplary process 1300 for receiving and processing a PUCCH including UCI generated using SC-FDMA and one-symbol STBC, in accordance with some aspects of the disclosure. As described below, some or all illustrated features may be omitted in a particular implementation within the scope of the present disclosure, and some illustrated features may not be required for implementation of all embodiments. In some examples, the process 1300 may be carried out by the scheduling entity 800 illustrated in FIG. 8. In some examples, the process 1300 may be carried out by any suitable apparatus or means for carrying out the functions or algorithm described below.

At block 1302, the scheduling entity may receive a PUCCH including a plurality of uplink control information (UCI), each transmitted by one of a set of scheduled entities. Each of the UCI includes a plurality of SC-FDMA symbols generated using STBC. For example, the UL traffic and control channel reception and processing circuitry 843 shown and described above in connection with FIG. 8 may receive the PUCCH.

At block 1304, the scheduling entity may time domain de-spread the plurality of SC-FDMA symbols received in a slot to produce a plurality of code blocks. In some examples, the scheduling entity may utilize cyclic affixes appended to each of the code blocks to identify the different code blocks. For example, the UL traffic and control channel reception and processing circuitry 843 shown and described above in connection with FIG. 8 may time domain de-spread the SC-FDMA symbols.

At block 1306, the scheduling entity may identify, from the plurality of code blocks, a first code block and a second code block that have the same spreading code. For example, the UL traffic and control channel reception and processing circuitry 843 shown and described above in connection with FIG. 8 may identify the first and second code blocks.

At block 1308, the scheduling entity may apply space-time block decoding over the first and second code blocks to produce first and second information blocks. The first information block may include a first set of modulated control symbols and a first cyclic affix appended to the first set of modulated control symbols. The second information block made include a second set of modulated control symbols and a second cyclic affix appended to the second set of modulated control symbols. For example, the UL traffic and control channel reception and processing circuitry 843 together with the STBC decoder circuitry 844 shown and described above in connection with FIG. 8 may space-time block decode the first and second code blocks.

At block 1310, the scheduling entity may demodulate the first and second sets of modulated control symbols to produce a plurality of control data (e.g., a set of original control information bits). For example, the UL traffic and control channel reception and processing circuitry 843 shown and described above in connection with FIG. 8 may demodulate the plurality of modulated control symbols.

In one configuration, a scheduled entity (e.g., the scheduled entity 900 shown in FIG. 9) within a wireless communication network includes means for generating uplink control information including a plurality of modulated control symbols for transmission on an uplink control channel, means for dividing the plurality of modulated control symbols into at least a first set of modulated control symbols and a second set of modulated control symbols, and means for appending a first cyclic affix to the first set of modulated control symbols to produce a first information block and a second cyclic affix to the second set of modulated control symbols to produce a second information block. The scheduled entity further includes means for encoding the first information block and the second information block utilizing space-time block coding to produce a first code block for transmission via a first antenna and a second code block for transmission via a second antenna, means for time domain spreading the first code block over a plurality of first SC-FDMA symbols transmitted via the first antenna utilizing a first spreading code, and means for time domain spreading the second code block over a plurality of second SC-FDMA symbols transmitted via the second antenna utilizing a second spreading code, where the first spreading code is the same as the second spreading code.

In one aspect, the aforementioned means may be the processor(s) 904 shown in FIG. 9 configured to perform the functions recited by the aforementioned means. For example, the aforementioned means for generating uplink control information including modulated control symbols, means for dividing the modulated control symbols into the first and second sets of modulated control symbols, and means for appending the first cyclic affix to the first set of modulated control symbols and the second cyclic affix to the second set of modulated control symbols may include the UL traffic and control channel generation and transmission circuitry 942 shown in FIG. 9. In addition, the aforementioned means for encoding the first and second information blocks may include the STBC encoder circuitry 946 shown in FIG. 9. Furthermore, the aforementioned means for time domain spreading the first and second code blocks may include the time domain spreading circuitry 948 shown in FIG. 9. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
generating uplink control information comprising a plurality of modulated control symbols for transmission on an uplink control channel;
dividing the plurality of modulated control symbols into at least a first set of modulated control symbols and a second set of modulated control symbols;
appending a first cyclic affix to the first set of modulated control symbols to produce a first information block and a second cyclic affix to the second set of modulated control symbols to produce a second information block;
encoding the first information block and the second information block utilizing space-time block coding to produce a first code block for transmission via a first antenna and a second code block for transmission via a second antenna;
time domain spreading the first code block over a plurality of first single-carrier frequency division multiple access (SC-FDMA) symbols transmitted via the first antenna utilizing a first spreading code; and
time domain spreading the second code block over a plurality of second SC-FDMA symbols transmitted via the second antenna utilizing a second spreading code, wherein the first spreading code is the same as the second spreading code.

2. The method of claim 1, wherein:
the first code block comprises the first information block and the second information block; and
the second code block comprises a complex conjugate of a modular of a number of modulated control symbols within the second information block and a negative complex conjugate of a modular of a number of modulated control symbols within the first information block.

3. The method of claim 1, wherein at least one of the first cyclic affix or the second cyclic affix is set to zero.

4. The method of claim 1, further comprising:
performing discrete Fourier transform (DFT) precoding on the first code block to produce first precoded symbols; and wherein time domain spreading the first code block further comprises:
time domain spreading the first precoded symbols to produce a plurality of first spread symbols.

5. The method of claim 4, further comprising:
mapping a portion of the plurality of first spread symbols onto a plurality of sub-carriers to produce a plurality of first modulated sub-carriers; and
performing an inverse fast Fourier transform on the plurality of first modulated sub-carriers to produce a plurality of first SC-FDMA uplink control channel symbols within a given SC-FDMA symbol of the plurality of first SC-FDMA symbols.

6. The method of claim 5, further comprising:
inserting a cyclic prefix within the given SC-FDMA symbol.

7. The method of claim 1, further comprising:
performing discrete Fourier transform (DFT) precoding on the second code block to produce second precoded symbols; and wherein time domain spreading the second code block further comprises:
time domain spreading the second precoded symbols to produce a plurality of second spread symbols.

8. The method of claim 7, further comprising:
mapping a portion of the plurality of second spread symbols onto a plurality of sub-carriers to produce a plurality of second modulated sub-carriers; and
performing an inverse fast Fourier transform on the plurality of second modulated sub-carriers to produce a plurality of second SC-FDMA uplink control channel symbols within a given SC-FDMA symbol of the plurality of second SC-FDMA symbols.

9. The method of claim 8, further comprising:
inserting a cyclic prefix within the given SC-FDMA symbol.

10. The method of claim 1, further comprising:
applying a first cyclic shift delay to one of the plurality of first SC-FDMA symbols to produce a first cyclic shifted SC-FDMA symbol;
transmitting the first cyclic shifted SC-FDMA symbol over a third antenna;
applying a second cyclic shift delay to one of the plurality of second SC-FDMA symbols to produce a second cyclic shifted SC-FDMA symbol; and
transmitting the second cyclic shifted SC-FDMA symbol over a fourth antenna.

11. The method of claim 10, wherein the first cyclic shift delay and the second cyclic shift delay are the same.

12. The method of claim 10, wherein the first cyclic shift delay and the second cyclic shift delay are different.

13. A scheduled entity within a wireless communication network, comprising:
a processor;
a memory communicatively coupled to the processor; and
a transceiver communicatively coupled to the processor, wherein the processor is configured to:
generate uplink control information comprising a plurality of modulated control symbols for transmission on an uplink control channel;
divide the plurality of modulated control symbols into at least a first set of modulated control symbols and a second set of modulated control symbols;
append a first cyclic affix to the first set of modulated control symbols to produce a first information block and a second cyclic affix to the second set of modulated control symbols to produce a second information block;
encode the first information block and the second information block utilizing space-time block coding to produce a first code block for transmission via a first antenna and a second code block for transmission via a second antenna;
time domain spread the first code block over a plurality of first single-carrier frequency division multiple access (SC-FDMA) symbols transmitted via the first antenna utilizing a first spreading code; and
time domain spread the second code block over a plurality of second SC-FDMA symbols transmitted via the second antenna utilizing a second spreading code, wherein the first spreading code is the same as the second spreading code.

14. The scheduled entity of claim 13, wherein:
the first code block comprises the first information block and the second information block; and
the second code block comprises a complex conjugate of a modular of a number of modulated control symbols within the second information block and a negative complex conjugate of a modular of a number of modulated control symbols within the first information block.

15. The scheduled entity of claim 13, wherein the processor is further configured to:
perform discrete Fourier transform (DFT) precoding on the first code block to produce first precoded symbols;
time domain spread the first precoded symbols to produce a plurality of first spread symbols;
map a portion of the plurality of first spread symbols onto a plurality of sub-carriers to produce a plurality of first modulated sub-carriers; and
perform an inverse fast Fourier transform on the plurality of first modulated sub-carriers to produce a plurality of first SC-FDMA uplink control channel symbols within a given SC-FDMA symbol of the plurality of first SC-FDMA symbols.

16. The scheduled entity of claim 15, wherein the processor is further configured to:
insert a cyclic prefix within the given SC-FDMA symbol.

17. The scheduled entity of claim 13, wherein the processor is further configured to:
perform discrete Fourier transform (DFT) precoding on the second code block to produce second precoded symbols;
time domain spread the second precoded symbols to produce a plurality of second spread symbols;
map a portion of the plurality of second spread symbols onto a plurality of sub-carriers to produce a plurality of second modulated sub-carriers; and
perform an inverse fast Fourier transform on the plurality of second modulated sub-carriers to produce a plurality of second SC-FDMA uplink control channel symbols within a given SC-FDMA symbol of the plurality of second SC-FDMA symbols.

18. The scheduled entity of claim 17, wherein the processor is further configured to:
insert a cyclic prefix within the given SC-FDMA symbol.

19. The scheduled entity of claim 13, wherein the processor is further configured to:
apply a first cyclic shift delay to one of the plurality of first SC-FDMA symbols to produce a first cyclic shifted SC-FDMA symbol;
transmit the first cyclic shifted SC-FDMA symbol over a third antenna;
apply a second cyclic shift delay to one of the plurality of second SC-FDMA symbols to produce a second cyclic shifted SC-FDMA symbol; and
transmit the second cyclic shifted SC-FDMA symbol over a fourth antenna.

20. A scheduled entity within a wireless communication network, comprising:
means for generating uplink control information comprising a plurality of modulated control symbols for transmission on an uplink control channel;
means for dividing the plurality of modulated control symbols into at least a first set of modulated control symbols and a second set of modulated control symbols;
means for appending a first cyclic affix to the first set of modulated control symbols to produce a first information block and a second cyclic affix to the second set of modulated control symbols to produce a second information block;
means for encoding the first information block and the second information block utilizing space-time block coding to produce a first code block for transmission via a first antenna and a second code block for transmission via a second antenna;
means for time domain spreading the first code block over a plurality of first single-carrier frequency division multiple access (SC-FDMA) symbols transmitted via the first antenna utilizing a first spreading code; and
means for time domain spreading the second code block over a plurality of second SC-FDMA symbols transmitted via the second antenna utilizing a second spreading code, wherein the first spreading code is the same as the second spreading code.

21. The scheduled entity of claim 20, wherein:
the first code block comprises the first information block and the second information block; and
the second code block comprises a complex conjugate of a modular of a number of modulated control symbols within the second information block and a negative complex conjugate of a modular of a number of modulated control symbols within the first information block.

22. The scheduled entity of claim 21, further comprising:
means for performing discrete Fourier transform (DFT) precoding on the first code block to produce first precoded symbols;
means for time domain spreading the first precoded symbols to produce a plurality of first spread symbols;
means for mapping a portion of the plurality of first spread symbols onto a plurality of sub-carriers to produce a plurality of first modulated sub-carriers; and
means for performing an inverse fast Fourier transform on the plurality of first modulated sub-carriers to produce a plurality of first SC-FDMA uplink control channel symbols within a given SC-FDMA symbol of the plurality of first SC-FDMA symbols.

23. The scheduled entity of claim 22, further comprising:
means for inserting a cyclic prefix within the given SC-FDMA symbol.

24. The scheduled entity of claim 20, further comprising:
means for performing discrete Fourier transform (DFT) precoding on the second code block to produce second precoded symbols;
means for time domain spreading the second precoded symbols to produce a plurality of second spread symbols;
means for mapping a portion of the plurality of second spread symbols onto a plurality of sub-carriers to produce a plurality of second modulated sub-carriers; and
means for performing an inverse fast Fourier transform on the plurality of second modulated sub-carriers to produce a plurality of second SC-FDMA uplink control channel symbols within a given SC-FDMA symbol of the plurality of second SC-FDMA symbols.

25. The scheduled entity of claim 24, further comprising:
means for inserting a cyclic prefix within the given SC-FDMA symbol.

26. The scheduled entity of claim 20, further comprising:
means for applying a first cyclic shift delay to one of the plurality of first SC-FDMA symbols to produce a first cyclic shifted SC-FDMA symbol;
means for transmitting the first cyclic shifted SC-FDMA symbol over a third antenna;
means for applying a second cyclic shift delay to one of the plurality of second SC-FDMA symbols to produce a second cyclic shifted SC-FDMA symbol; and means for transmitting the second cyclic shifted SC-FDMA symbol over a fourth antenna.

27. A method of wireless communication, comprising:
receiving an uplink signal comprising an uplink control channel at a scheduling entity, the uplink control channel comprising a plurality of uplink control information, each transmitted by one of a set of scheduled entities, wherein each of the plurality of uplink control information comprises a plurality of single-carrier frequency division multiple access (SC-FDMA) symbols;
time domain de-spreading the plurality of SC-FDMA symbols to produce a plurality of code blocks;
identifying, from the plurality of code blocks, a first code block and a second code block that each comprise a same spreading code;
applying space-time block decoding over the first code block and the second code block to produce a first information block comprising a first set of modulated control symbols and a first cyclic affix appended to the first set of modulated control symbols and a second information block comprising a second set modulated control symbols and a second cyclic affix appended to the second set of modulated control symbols; and
demodulating the first set of modulated control symbols and the second set of modulated control symbols to produce a plurality of control data.

28. The method of claim 27, wherein identifying the first code block and the second code block further comprises:
utilizing the first cyclic affix and the second cyclic affix to identify the first code block and the second code block.

29. The method of claim 27, wherein the first code block comprises the first information block and the second information block and the second code block comprises a complex conjugate of a modular of a number of modulated control symbols within the second information block and a negative complex conjugate of a modular of a number of modulated control symbols within the first information block.

30. The method of claim 27, further comprising:
removing a respective cyclic prefix between respective pairs of the plurality of SC-FDMA symbols.

* * * * *